US012549952B2

(12) United States Patent
Singh

(10) Patent No.: US 12,549,952 B2
(45) Date of Patent: Feb. 10, 2026

(54) SUBSCRIBER IDENTITY MODULE (SIM) CARD FEATURE-BASED NON-FUNGIBLE TOKEN (NFT)

(71) Applicant: BANK OF AMERICA CORPORATION, Charlotte, NC (US)

(72) Inventor: Shailendra Singh, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 483 days.

(21) Appl. No.: 17/898,837

(22) Filed: Aug. 30, 2022

(65) Prior Publication Data

US 2024/0073697 A1    Feb. 29, 2024

(51) Int. Cl.
*H04W 12/72* (2021.01)
*H04L 9/00* (2022.01)
*H04W 12/06* (2021.01)

(52) U.S. Cl.
CPC .............. *H04W 12/72* (2021.01); *H04L 9/50* (2022.05); *H04W 12/06* (2013.01); *H04L 2209/463* (2013.01)

(58) Field of Classification Search
CPC ........ H04W 12/72; H04W 12/06; H04L 9/50; H04L 2209/463; H04L 2209/80
See application file for complete search history.

(56) References Cited

U.S. PATENT DOCUMENTS

| 6,610,105 | B1 * | 8/2003 | Martin, Jr. | ........ H04M 1/72445 |
| | | | | 715/202 |
| 10,552,828 | B2 | 2/2020 | Hammad | |
| 10,755,274 | B2 | 8/2020 | Ortiz et al. | |
| 11,075,891 | B1 | 7/2021 | Long et al. | |
| 11,080,701 | B2 | 8/2021 | Scott et al. | |
| 2003/0054860 | A1 * | 3/2003 | Chen | ...................... H04M 1/275 |
| | | | | 455/564 |
| 2006/0268838 | A1 * | 11/2006 | Larsson | ................ H04W 28/18 |
| | | | | 370/352 |
| 2015/0026826 | A1 * | 1/2015 | Allegri | .................. H04W 12/06 |
| | | | | 726/29 |
| 2015/0111413 | A1 * | 4/2015 | Jiang | .................... H01R 13/506 |
| | | | | 439/370 |

(Continued)

OTHER PUBLICATIONS

Niu, "Application of a New Feature Generation Algorithm in Intrusion Detection System" (Year: 2022).*

(Continued)

*Primary Examiner* — Jinsong Hu
*Assistant Examiner* — Justin Barry
(74) *Attorney, Agent, or Firm* — Moore & Van Allen PLLC; Anup Iyer

(57) ABSTRACT

A Subscriber Identity Module (SIM) card feature-based Non-Fungible Token. SIM card features, such as communication features, software/hardware features, electrical features, SIM Card behavior features and/or the like are extracted from the SIM card of a user's mobile communication device and a SIM card feature-based NFT is generated and stored on a distributed trust computing network. The distributed trust computing network serves to verify the authenticity of the underlying SIM card features. The NFT is subsequently used as a means for authentication is resource exchange events and other events requiring user/mobile communication device verification.

17 Claims, 16 Drawing Sheets

(56) References Cited

U.S. PATENT DOCUMENTS

| | | |
|---|---|---|
| 2015/0339663 A1 | 11/2015 | Lopreiato et al. |
| 2017/0046806 A1 | 2/2017 | Haldenby et al. |
| 2017/0237554 A1 | 8/2017 | Jacobs et al. |
| 2019/0238316 A1 | 8/2019 | Padmanabhan |
| 2020/0034830 A1 | 1/2020 | Ortiz et al. |
| 2020/0089671 A1 | 3/2020 | Padmanabhan et al. |
| 2021/0166242 A1 | 6/2021 | Ross |
| 2021/0264412 A1 | 8/2021 | Wilson |
| 2021/0279695 A1 | 9/2021 | Rice |
| 2022/0040557 A1 | 2/2022 | Tran |
| 2022/0270725 A1 | 8/2022 | Derosa-Grund |
| 2022/0329446 A1* | 10/2022 | Jackson ............... H04L 9/3247 |
| 2023/0188600 A1* | 6/2023 | Sulibhavi ............... H04L 9/50 709/224 |
| 2023/0281604 A1* | 9/2023 | Robell ............... G06Q 30/018 |
| 2023/0284012 A1* | 9/2023 | Voruganti ......... H04W 12/0471 455/411 |
| 2023/0362655 A1* | 11/2023 | Farag ............... H04L 63/1416 |
| 2023/0396455 A1* | 12/2023 | Wane ............... H04L 9/3213 |
| 2024/0015515 A1* | 1/2024 | Jaiswal ............... H04W 12/126 |
| 2024/0020355 A1* | 1/2024 | Binder ............... H04L 9/50 |
| 2024/0039937 A1* | 2/2024 | Koral ............... H04L 63/1441 |

OTHER PUBLICATIONS

Khoury, "Decentralized_Voting_Platform_Based_on_Ethereum_Blockchain" (Year: 2018).*

Coindesk, "How do Ethereum Smart Contracts Work" (Year: 2021).*

Medium, "Anomaly Detection with LSTM" (Year: 2022).*

Stack Exchange, "Anomaly Detection with LSTM" (Year: 2022).*

"dCube by Datavisor" Datavisor [retrieved on Sep. 15, 2020] <https://web.archive.org/web/20201028170945/https://www.datavisor.com/products/dcube/> (Year: 2020).*

"What is SIM Swap Fraud" Datavisor [retrieved on Sep. 15, 2020] <https://web.archive.org/web/20200930081626/https://www.datavisor.com/wiki/sim-swap-fraud/> (Year: 2020).*

* cited by examiner

SUBSCRIBER IDENTITY MODULE (SIM) CARD FEATURE-BASED NON-FUNGIBLE TOKEN (NFT)

FIELD OF THE INVENTION

The present invention is generally directed to computer security and, more specifically, verifying authenticity of Subscriber Identity Module (SIM) card feature-based security credentials using a Non-Fungible Token (NFT).

BACKGROUND

Typically, authentication credentials are associated with a user, such as a username, passcode, biometric data or the like. In certain instances, such information is capable of being wrongfully obtained or otherwise duplicated by a malicious entity. In other instances, user-specific authentication credentials may not alone be adequate for purposes of authentication. For example, a need may exist to verify or otherwise authenticate that a user is verifiably associated with the device they are using, such as a mobile communication device or the like.

A SIM card is a physical device containing an integrated circuit (IC) that is configured to removably inserted into a mobile communication device. The memory of the IC stores, among other features, the International Mobile Subscriber Identity (IMSI) number and its related key, which are used to identify and authenticate the user on the mobile communication device. Once a malicious actor has successfully cloned a user's SIM card, the malicious actor is able to insert the cloned SIM card into their mobile communication device as a means of impersonating the user (e.g., conducting illicit resource exchange events or the like).

Therefore, a need exists to develop systems, methods, computer program products and the like that provide an innovative means for authenticating a user and/or the user's mobile communication device. Moreover, the desired systems, methods, computer program products and the like should provide for verifying that the security credentials are authenticate and unaltered.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for Subscriber Identity Module (SIM) card feature-based security credentials and, more specifically, a Non-Fungible Token (NFT) that is generated based on SIM card features.

Specifically, SIM card features, such as communication features, software/hardware features, electrical features, SIM Card behavior features and the like are extracted from the SIM card of a user's mobile communication device and a SIM card feature-based NFT is generated and stored on a distributed trust computing network. In this regard, the distributed trust computing network serves to verify the authenticity of the underlying SIM card features.

In specific embodiments of the invention, the SIM card features are being monitored over time (periodically or, in some instances, continuously) for changes. Deep learning, such as neural networks, are implemented to determine whether the changes are normal changes, which necessitate generation of a new NFT or abnormal changes, indicative of possible SIM card tampering or the like. In other embodiments of the invention, insertion of new SIM card into the mobile communication device is detected and, once verified as being a SIM card authorized for use by the user, SIM card features are extracted and another NFT is generated that is also associated with the user's mobile communication device.

In a specific use case, the SIM card feature-based NFT is used for authentication of a resource exchange event. In this regard, the user's mobile communication device initiates a resource exchange event, and the current SIM card features are extracted, in real-time, from the SIM card currently residing in the mobile communication device. The distributed trust computing network is accessed and the NFT is decrypted to identify the SIM card features used to generate the NFT. The currently extracted SIM card features are compared to the SIM card features used to generate the NFT. The comparison is an intelligent comparison, in that it takes into account, normal changes that may have occurred between the generation of the SIM card feature file and time of the resource exchange event. If the comparison results in no anomalies (i.e., no significant changes), the resource exchange event is deemed to verified/authenticated and further processing may ensue. If the comparison results in anomalies, the resource exchange event may be denied further processing or further resource exchange event authentication rules may be applied. In specific embodiments of the invention the authentication rules that are applied are determined in real-time based on features of the (i) the user, (ii) the mobile device and/or (iii) the resource exchange event.

A system for validating security credentials defines first embodiments of the invention. The system includes a mobile communication device in possession of a user that includes a Subscriber Identity Module (SIM) receptacle for receiving a SIM card. The system additionally includes a first computing platform having a first memory and one or more first processing devices in communication with the first memory. The first memory stores a SIM card feature extraction engine that is executable by at least one of the one or more first processing devices. The SIM card feature extraction engine is configured to extract a plurality of baseline SIM card features from an initial SIM card residing in the SIM card receptacle. The system additionally includes a second computing platform having a second memory and one or more second processing devices in communication with the second memory. The second memory stores a SIM card feature-based Non-Fungible Token (NFT) and smart contract generator engine that is executable by at least one of the one or more second processing devices. The SIM card feature-based Non-Fungible Token (NFT) and smart contract generator engine is configured to generate a first NFT based on the baseline SIM card features, generate a smart contract associated with the first NFT that includes rules for accessing and using the first NFT and communicate the first NFT and smart contract to a distribute trust computing network. The system additionally includes the distributed trust computing network, which includes a plurality of decentralized nodes. Each decentralized node having a third memory and one or more third processing devices in communication with the third memory. The third memory of the decentralized nodes is configured to store a distributed ledger, which includes a plurality of data blocks. The distributed trust computing network is configured to receive the first NFT and the smart contract, and two or more of the decentralized nodes are configured to validate (i.e., reach consensus) an authenticity of the baseline SIM card features (i.e., the first NFT), and, in response to validation, store the first NFT as data block on the distributed ledger.

In specific embodiments of the system, the SIM card feature extraction engine is further configured to periodically, over time, extract the plurality of baseline SIM card features from the initial SIM card residing in the SIM card receptacle and determine changes between the baseline SIM card features currently extracted and the baseline SIM card features in the first NFT. In such embodiments of the invention, the SIM card feature-based Non-Fungible Token (NFT) and smart contract generator engine is further configured to generate a second NFT based on the changes to the baseline SIM card features. Further, the distributed trust computing network is configured to receive the second NFT and two or more of the decentralized nodes are configured to validate an authenticity of at least the changes to the baseline SIM card features. In in response to validation, the second NFT is stored as another data block on the distributed ledger, and according to at least one rule in the smart contract the first NFT is deactivated and the second NFT is activated.

In further specific embodiments of the system, the first memory further stores a SIM feature anomaly detection engine that implements one or more deep learning algorithms. The SIM feature anomaly detection engine is executable by at least one of the one or more first processing devices. The SIM feature anomaly detection engine is configured to analyze the changes between the baseline SIM card features currently extracted and the baseline SIM card features in the first NFT to determine which of the changes are indicative of normal SIM card behavior and which of the changes are indicative of abnormal SIM card behavior. In such embodiments of the system, for changes determined to be indicative of normal SIM card behavior, generate a second NFT, and for changes determined to be indicative of abnormal behavior, implement one or more suspicious activity actions.

In additional specific embodiments the system, the SIM card feature extraction engine is further configured to detect (i) removal of the initial SIM card from the SIM card receptacle and (ii) insertion of another SIM card into the SIM card receptacle, and, in response to detecting (i) and (ii), extract a plurality of baseline SIM card features from the other SIM card residing in the SIM card receptacle. In related embodiments of the system, the SIM card feature-based Non-Fungible Token (NFT) and smart contract generator engine is further configured to generate a second NFT that is based on the baseline SIM card features of the other SIM card and associated with the mobile communication device. In such embodiments of the system, the distributed trust computing network is configured to receive the second NFT and two or more of the decentralized nodes are configured to validate an authenticity of the baseline SIM card features of the other SIM card. In response to validation, the second NFT is stored as another data block on the distributed ledger.

According to specific embodiments of the system, the plurality of baseline SIM card features and the plurality of SIM card features include one or more of (i) communication features, (ii) software and firmware features, (iii) electrical features, (iv) hardware features, and (v) behavior of SIM card in respect to the mobile communication device.

Moreover, in additional specific embodiments the system includes a third computing platform having a fourth memory and one or more fourth processing devices in communication with the fourth memory. The fourth memory stores a SIM card verification engine that is executable by at least one of the one or more fourth processing devices. The SIM card verification engine is configured to receive a signal from the mobile communication device that indicates initiation of an event, and, in response to receiving the signal, extract a plurality of SIM card features from a SIM card currently residing in the SIM card receptacle. The SIM card verification engine is further configured to access the distributed trust computing network and perform a comparison between (i) the SIM card features, and (ii) the baseline SIM card features in the first NFT, and, in response to the comparison exhibiting a match between the (i) the SIM card features, and (ii) the baseline SIM card features in the first NFT, authorize further processing of the event. In related embodiments of system, the fourth memory further stores an event validation rules engine, that is executable by at least one of the one or more second processing devices. The event validation rules engine is configured to, in response to the comparison not exhibiting a match between the (i) the SIM card features, and (ii) the baseline SIM card features in the first NFT, determine one or more validation rules to apply to the event based on attributes of one or more of (i) the user, (ii) the mobile communication device, and (iii) the event, and apply the one or more validation rules to the resource exchange event.

A computer-implemented method for authenticating security credentials defines second embodiments of the invention. The computer-implemented method is executable by one or more computing processor devices. The method includes extracting a plurality of baseline SIM card features from an initial SIM card residing in a SIM card receptacle of a mobile communication device. In response to extracting, the method further includes generating a first NFT based on the baseline SIM card features, generating a smart contract associated with the first NFT that comprises rules for accessing and using the first NFT, and communicating the first NFT and smart contract to a distributed trust computing network. In addition, the method includes validating an authenticity of the baseline SIM card features by consensus of two or more of a plurality of decentralized nodes that form the distributed trust computing network, and, in response to validation, storing the first NFT as a data block on a distributed ledger of the distributed trust computing network.

In specific embodiments the method further includes periodically, over time, extracting the plurality of baseline SIM card features from the initial SIM card residing in the SIM card receptacle and determining changes between the baseline SIM card features currently extracted and the baseline SIM card features in the first NFT. In response to determining changes, the method further includes generating a second NFT based on the changes to the baseline SIM card features and communicating the second NFT to the distributed trust computing network. The method further includes validating an authenticity of at least the changes to baseline SIM card features in the second NFT by consensus of two or more of a plurality of decentralized nodes that form the distributed trust computing network. In response to validation, the method includes storing the second NFT as a data block on a distributed ledger of the distributed trust computing network and activating the second NFT and deactivating the first NFT. In related specific embodiments the method further includes implementing deep learning algorithms to analyze the changes between the baseline SIM card features currently extracted and the baseline SIM card features in the first NFT to determine which of the changes are indicative of normal SIM card behavior and which of the changes are indicative of abnormal SIM card behavior. In such embodiments of the method, for changes determined to be indicative of normal SIM card behavior, generating the second NFT, and for changes determined to be indicative of abnormal behavior, implementing one or more suspicious activity actions.

In other specific embodiments the method includes detecting (i) removal of the initial SIM card from the SIM card receptacle and (ii) insertion of another SIM card into the SIM card receptacle, and, in response to detecting (i) and (ii), extracting a plurality of baseline SIM card features from the other SIM card residing in the SIM card receptacle. In related embodiments the method further includes generating a second NFT that is based on the baseline SIM card features of the other SIM card and associated with the mobile communication device and communicating the second NFT to the distributed trust computing network. In response to the distributed trust network receiving the second NFT, the method includes validating an authenticity of at least the baseline SIM card features in the second NFT by consensus of two or more of a plurality of decentralized nodes that form the distributed trust computing network, and in response to validation, storing the second NFT as a data block on a distributed ledger of the distributed trust computing network.

Moreover, in additional specific embodiments of the method, the plurality of baseline SIM card features and the plurality of SIM card features include one or more of (i) communication features, (ii) software and firmware features, (iii) electrical features, (iv) hardware features, and (v) behavior of SIM card in respect to the mobile communication device.

A computer program product including a non-transitory computer-readable medium defines third embodiments of the invention. The computer-readable medium includes a first set of codes for causing a computer to extract a plurality of baseline SIM card features from an initial SIM card residing in a SIM card receptacle of a mobile communication device. Additionally, the computer-readable medium includes a second set of codes for causing a computer to generate a first NFT based on the baseline SIM card features, a third set of codes for causing a computer to generate a smart contract associated with the first NFT that comprises rules for accessing and using the first NFT and a fourth set of codes for causing a computer to communicate the first NFT and smart contract to a distributed trust computing network. Moreover, the computer-readable medium includes a fifth set of codes for causing a computer to validate an authenticity of the baseline SIM card features by consensus of two or more of a plurality of decentralized nodes that form the distributed trust computing network, and a sixth set of codes for causing a computer to, in response to validation, storing the first NFT as a data block on a distributed ledger of the distributed trust computing network.

In other specific embodiments of the computer program product, the computer-readable medium includes a seventh set of codes for causing a computer to periodically, over time, extract the plurality of baseline SIM card features from the initial SIM card residing in the SIM card receptacle and an eighth set of codes for causing a computer to determine changes between the baseline SIM card features currently extracted and the baseline SIM card features in the first NFT. In addition, the computer-readable medium includes a ninth set of codes for causing a computer to generate a second NFT based on the changes to the baseline SIM card features, and communicating the second NFT to the distributed trust computing network. Additionally, the computer-readable medium includes a tenth set of codes for causing validating an authenticity of at least the changes to baseline SIM card features in the second NFT by consensus of two or more of a plurality of decentralized nodes that form the distributed trust computing network and an eleventh set of codes for causing a computer to, in response to validation, store the second NFT as a data block on a distributed ledger of the distributed trust computing network. Further, the computer-readable medium includes a twelfth set of codes for causing a computer to activate the second NFT and deactivate the first NFT. In related embodiments of the computer program product, the computer-readable medium includes a thirteenth set of codes for causing a computer to implement deep learning algorithms to analyze the changes between the baseline SIM card features currently extracted and the baseline SIM card features in the first NFT to determine which of the changes are indicative of normal SIM card behavior and which of the changes are indicative of abnormal SIM card behavior. In such embodiments of the computer program product, the ninth set of codes are further configured to cause the computer to, for changes determined to be indicative of normal SIM card behavior, generate the second NFT.

In further specific embodiments of the computer program product, the computer-readable medium further includes a seventh set of codes for causing a computer to detect (i) removal of the initial SIM card from the SIM card receptacle and (ii) insertion of another SIM card into the SIM card receptacle, and an eighth set of codes for causing a computer to, in response to detecting (i) and (ii), extract a plurality of baseline SIM card features from the other SIM card residing in the SIM card receptacle. In related embodiments of the computer program product, the computer-readable medium further includes a ninth set of codes for causing a computer to generate a second NFT that is based on the baseline SIM card features of the other SIM card and associated with the mobile communication device and communicate the second NFT to the distributed trust computing network. In addition, the computer-readable medium includes an eleventh set of codes for causing a computer to validate an authenticity of at least the baseline SIM card features in the second NFT by consensus of two or more of a plurality of decentralized nodes that form the distributed trust computing network, and a twelfth set of codes for causing a computer to, in response to validation, storing the second NFT as a data block on a distributed ledger of the distributed trust computing network.

Thus, according to embodiments of the invention, which will be discussed in greater detail below, the present invention provides for a Subscriber Identity Module (SIM) card feature-based Non-Fungible Token (NFT). SIM card features, such as communication features, software/hardware features, electrical features, SIM Card behavior features and the like are extracted from the SIM card of a user's mobile communication device and a SIM card feature-based NFT is generated and stored on a distributed trust computing network. In this regard, the distributed trust computing network serves to verify the authenticity of the underlying SIM card features. The NFT is subsequently used as a means for authentication is resource exchange events and other events requiring user/mobile communication device verification.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
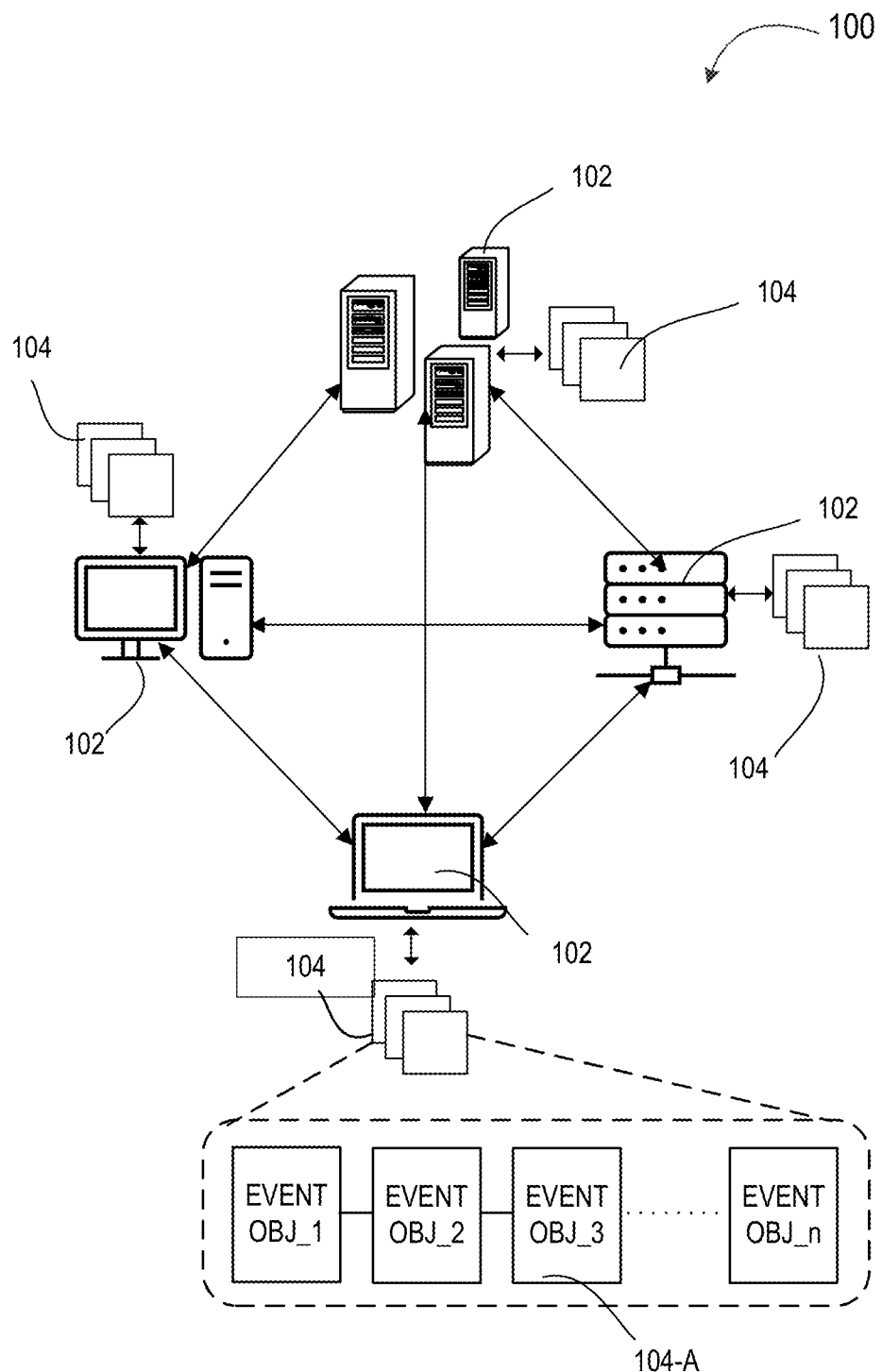
Figure 2:
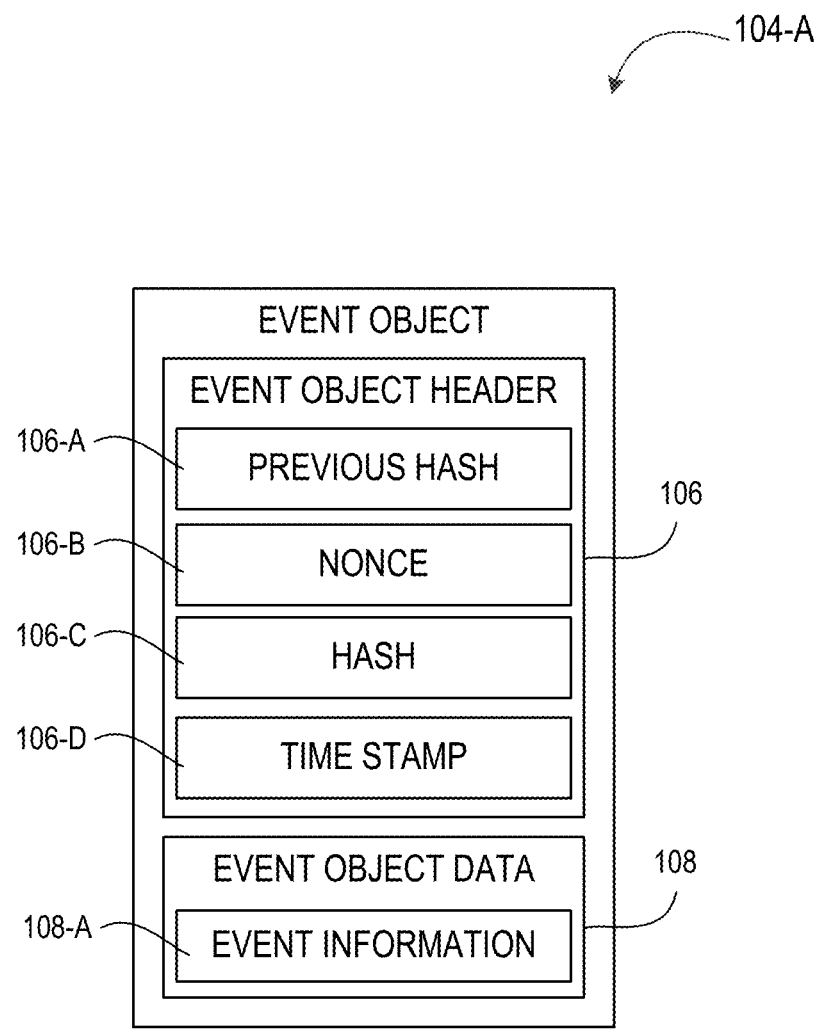
Figure 3:
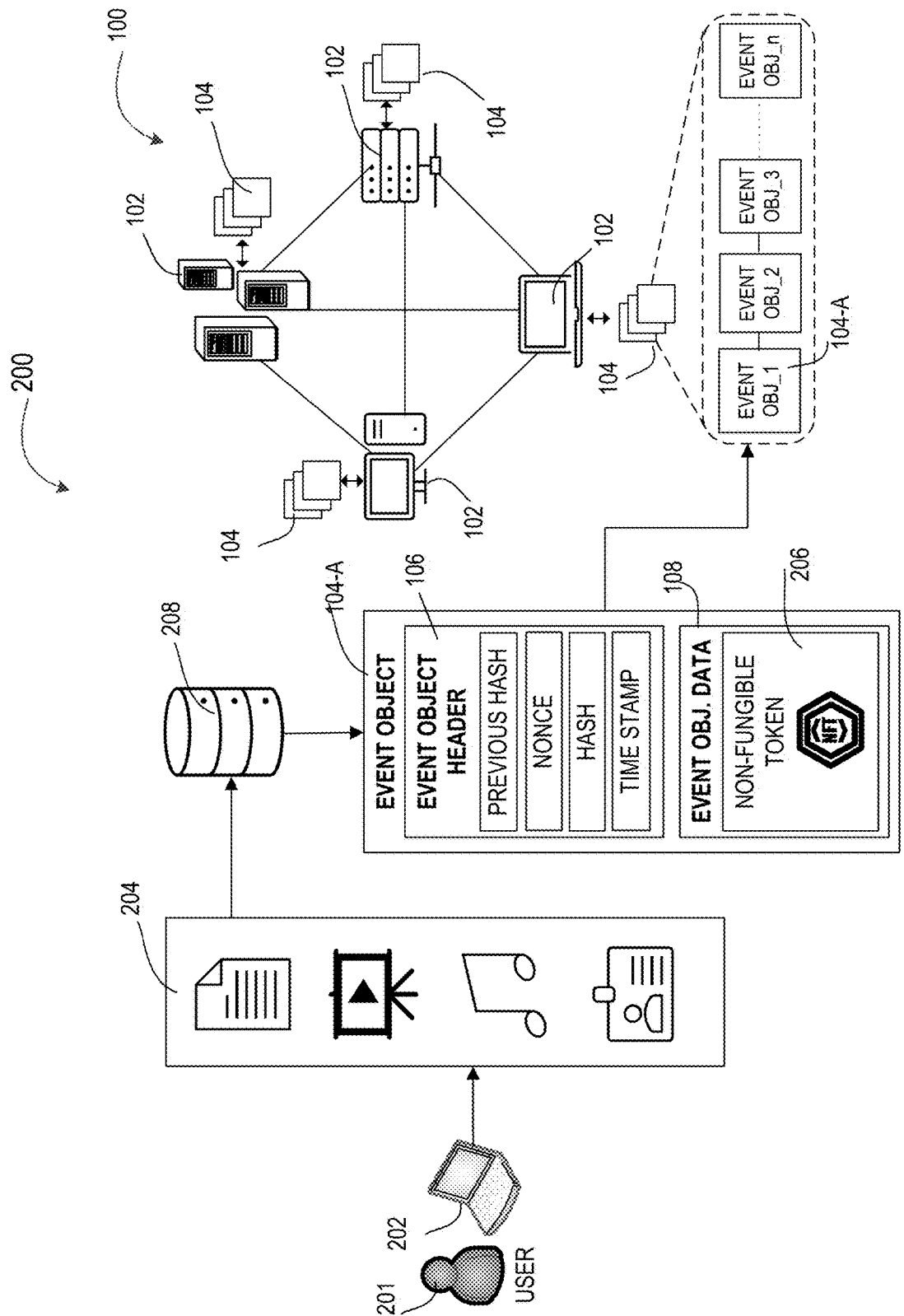
Figure 4:
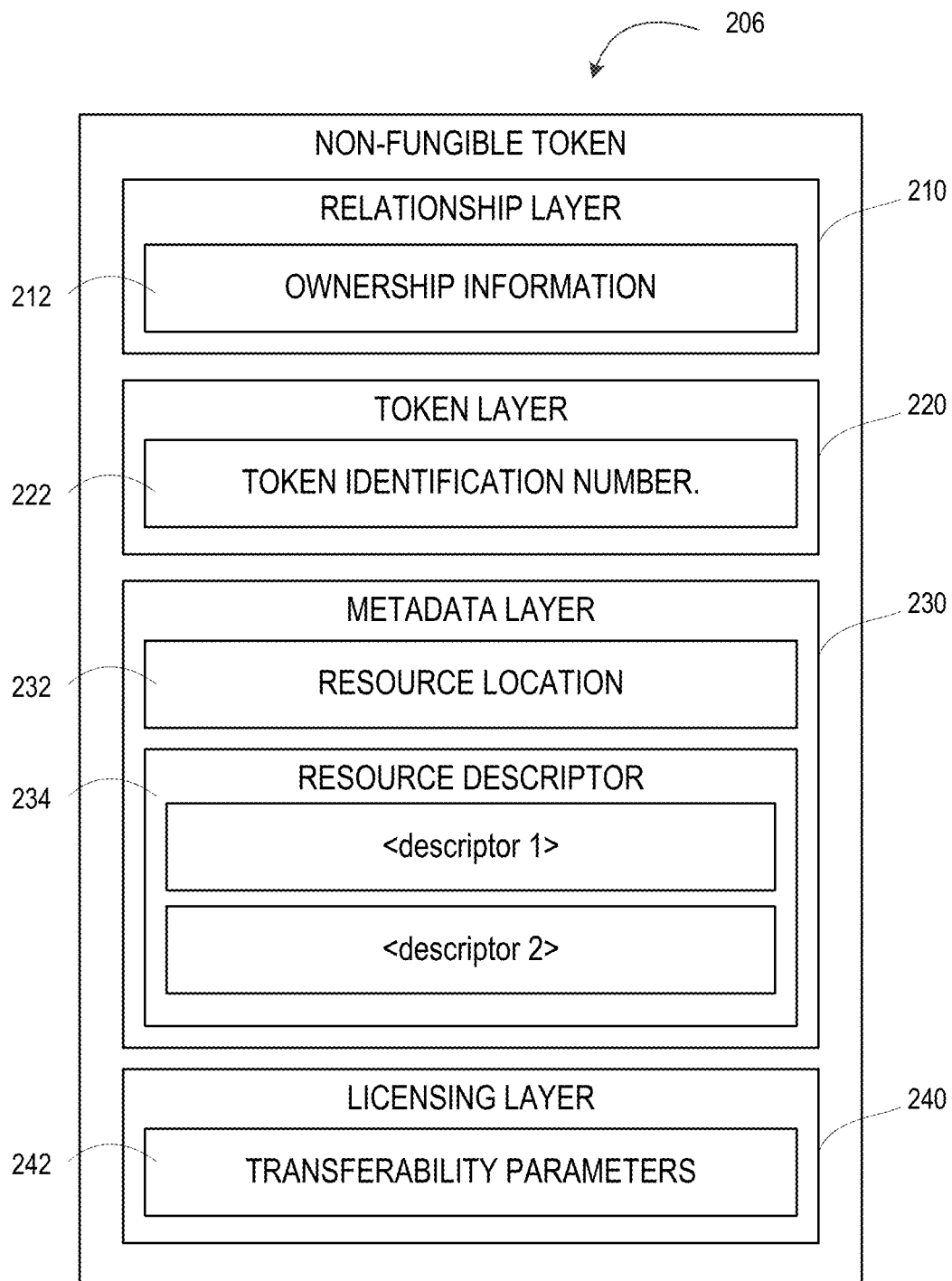
Figure 5:
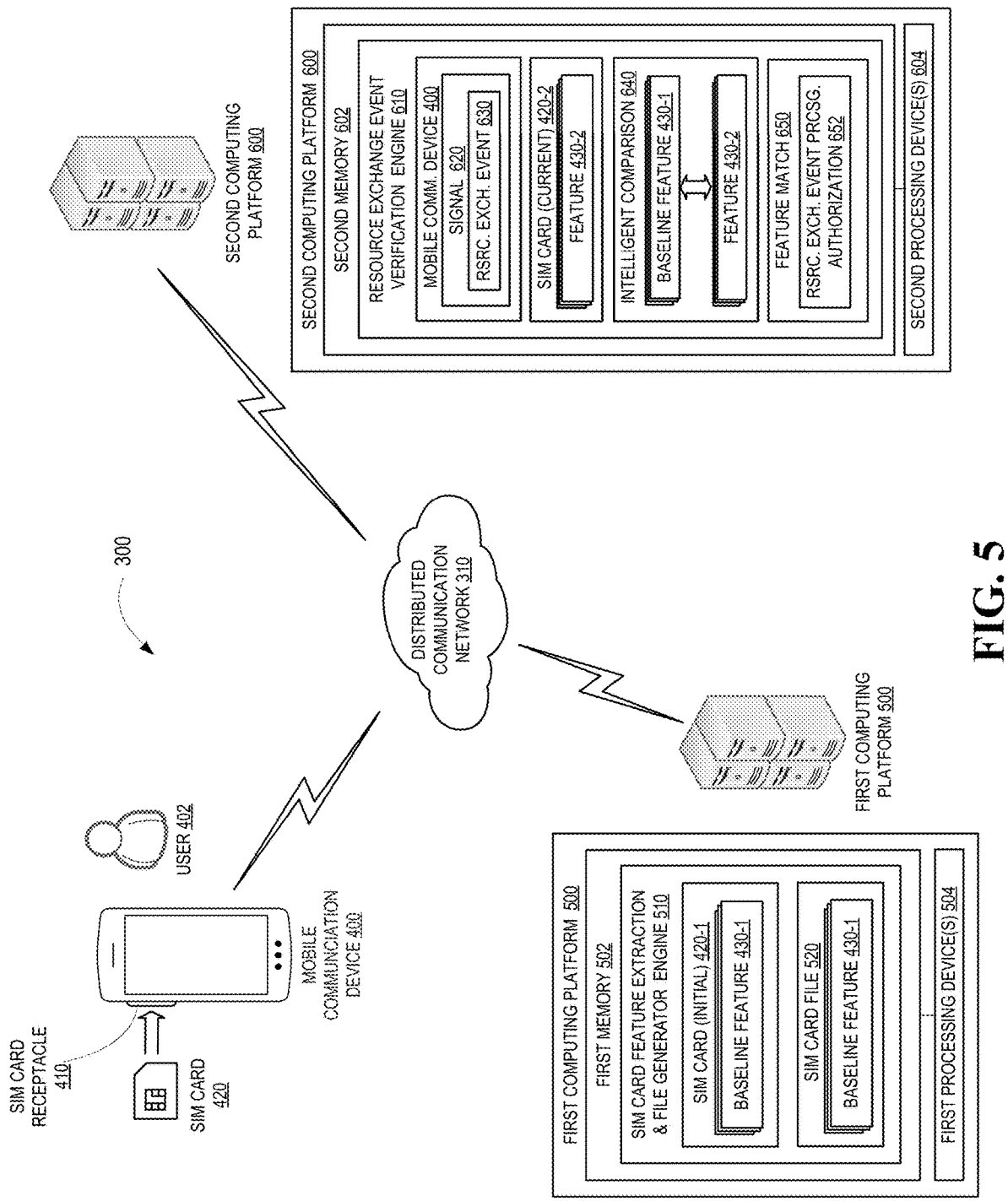
Figure 6:
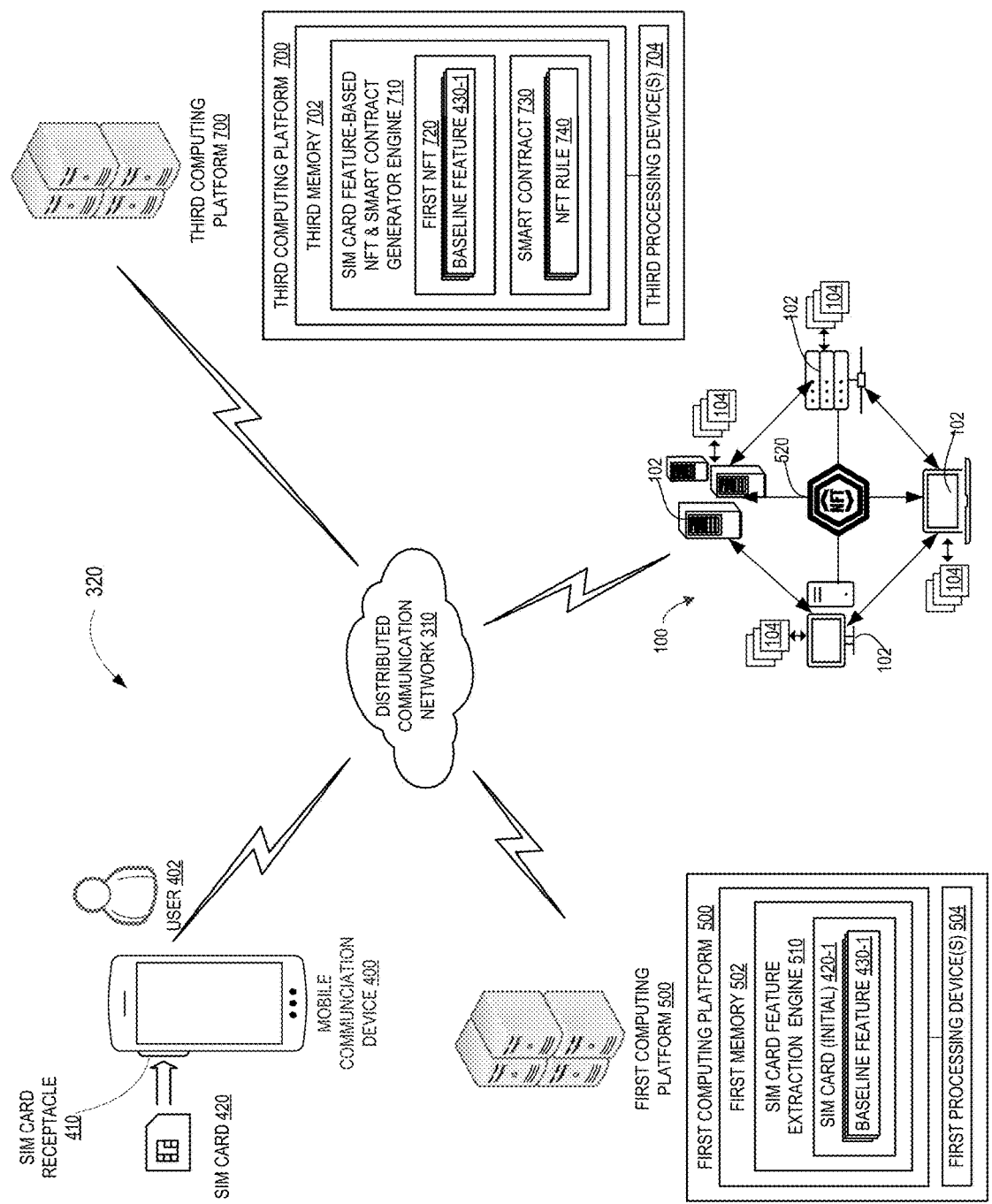
Figure 7:
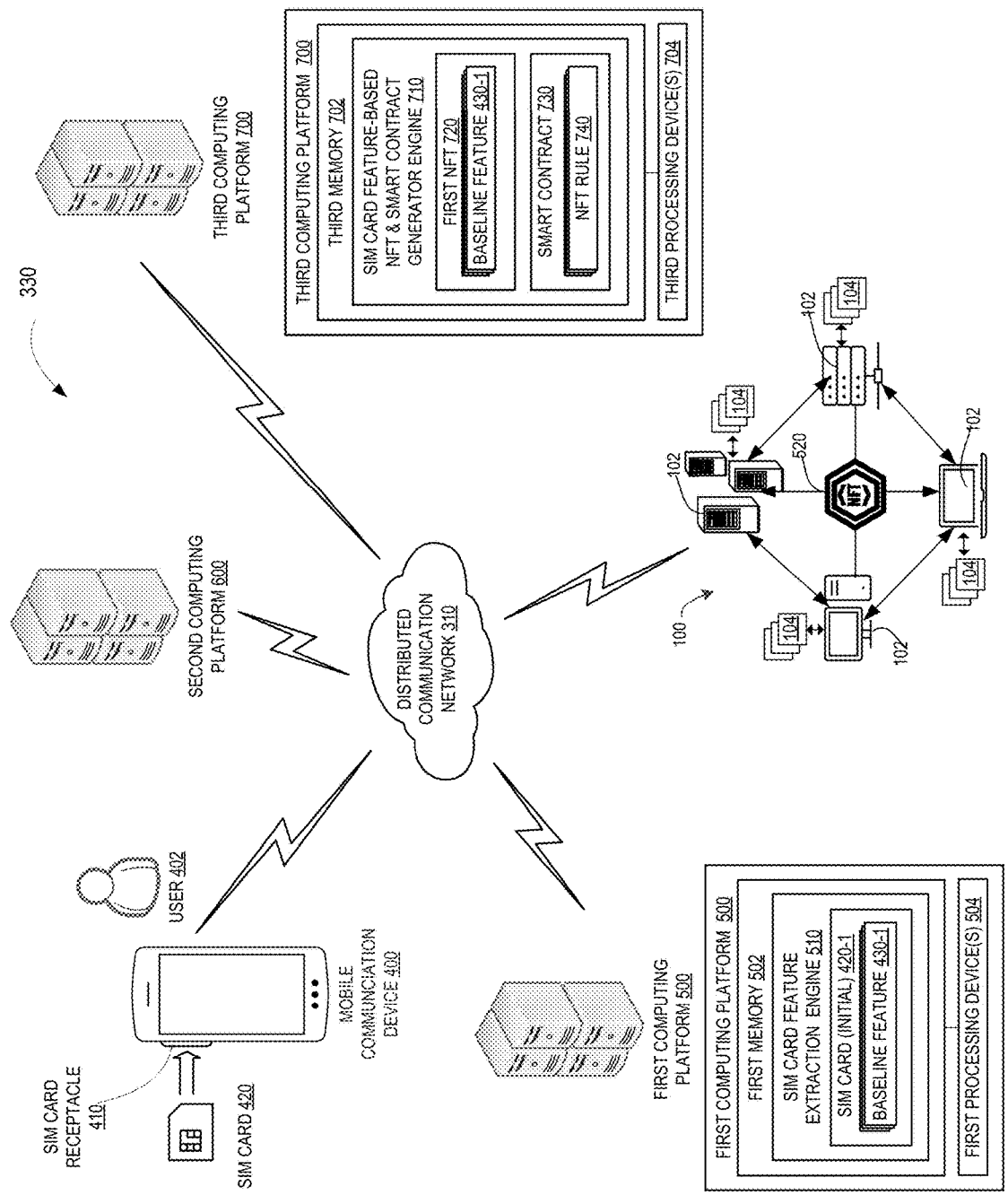
Figure 8:
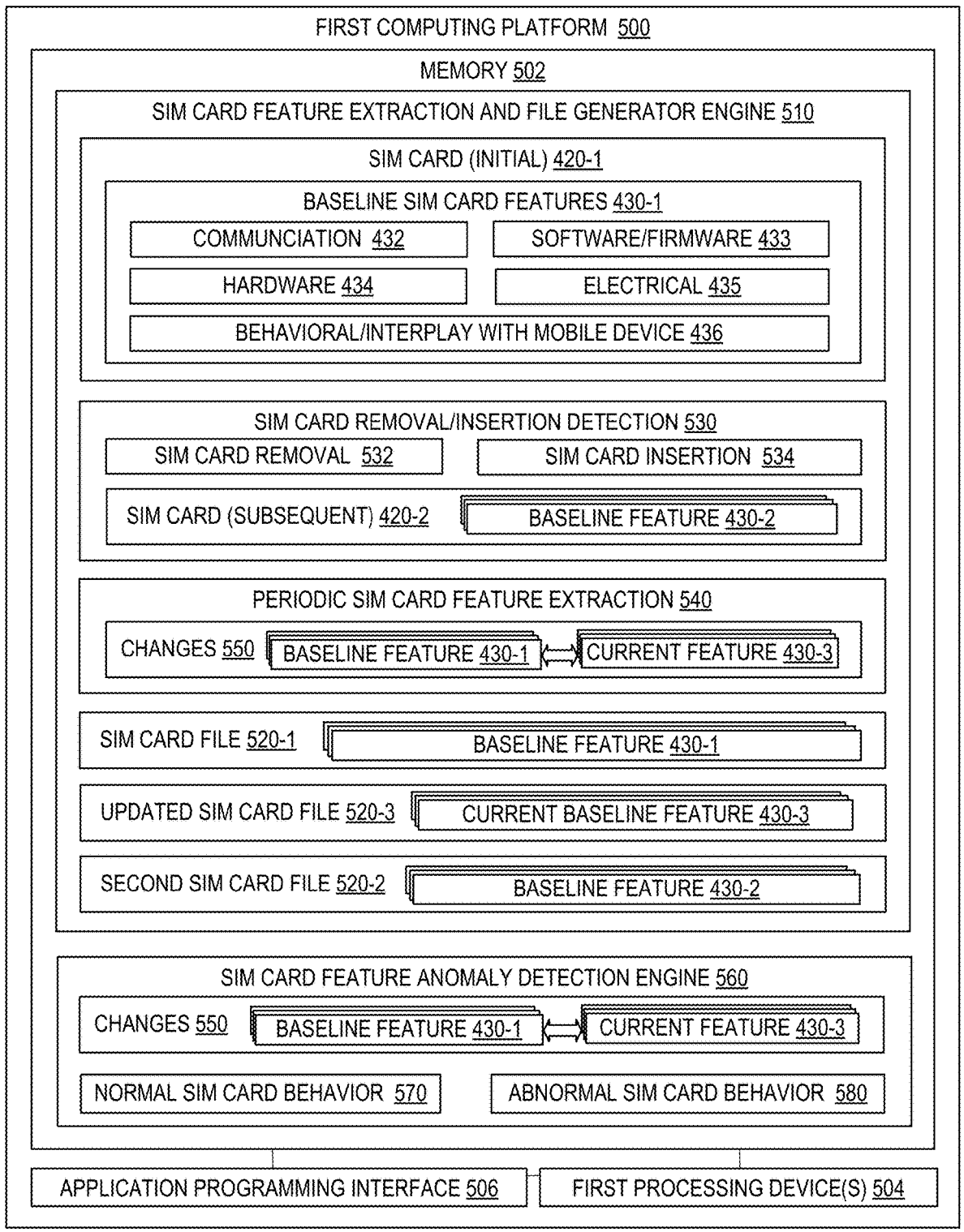
Figure 9:
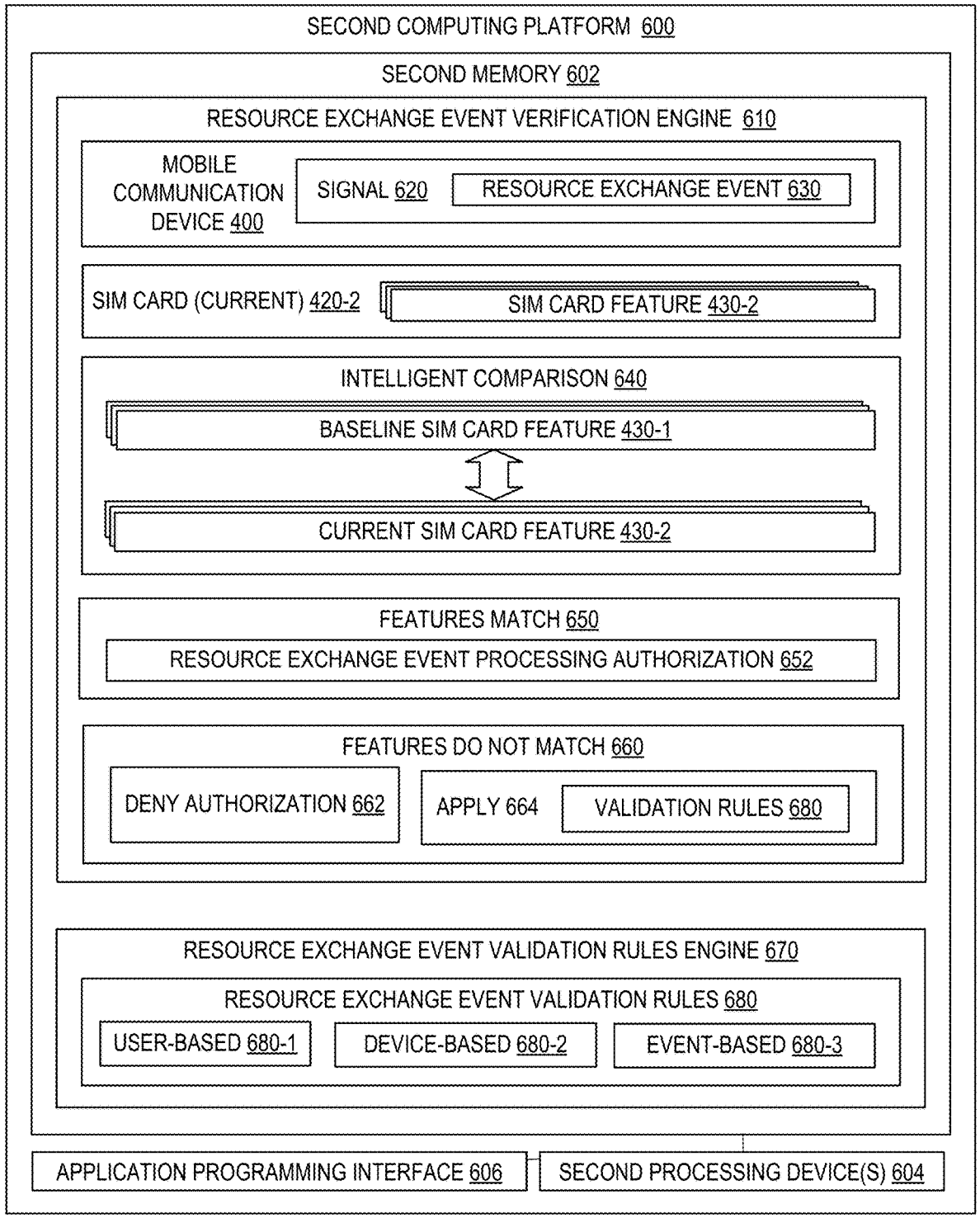
Figure 10:
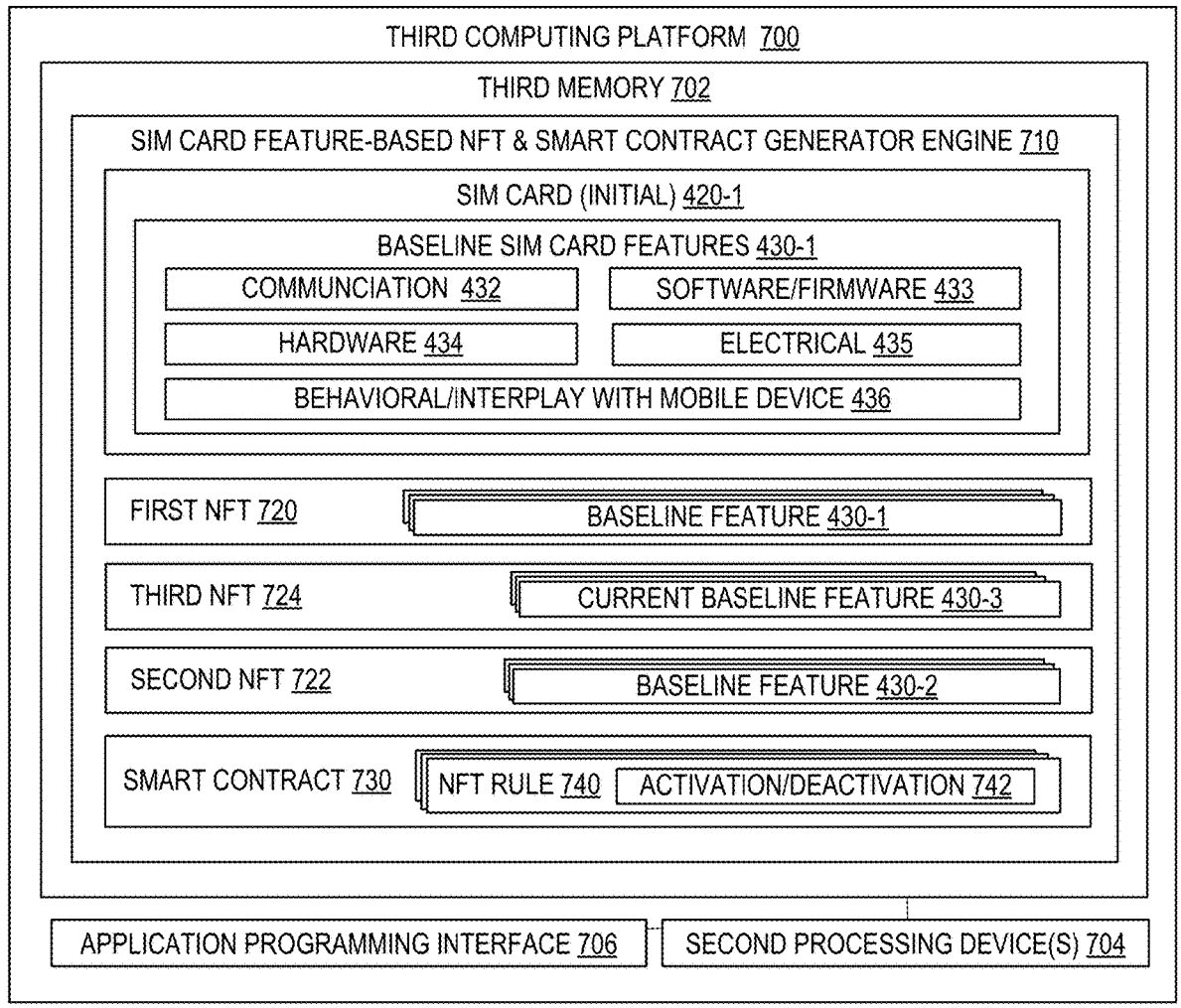
Figure 11:
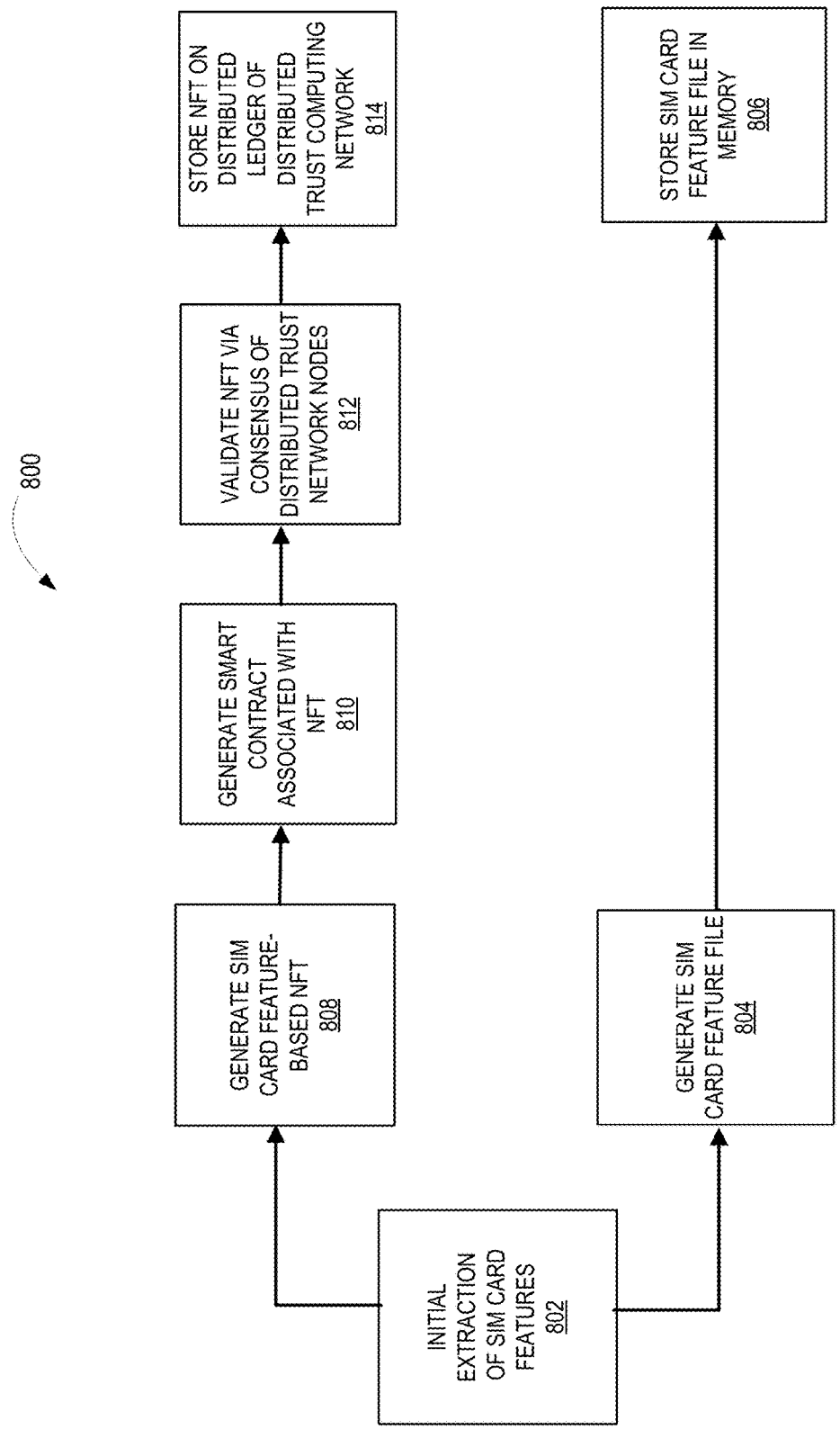
Figure 12:
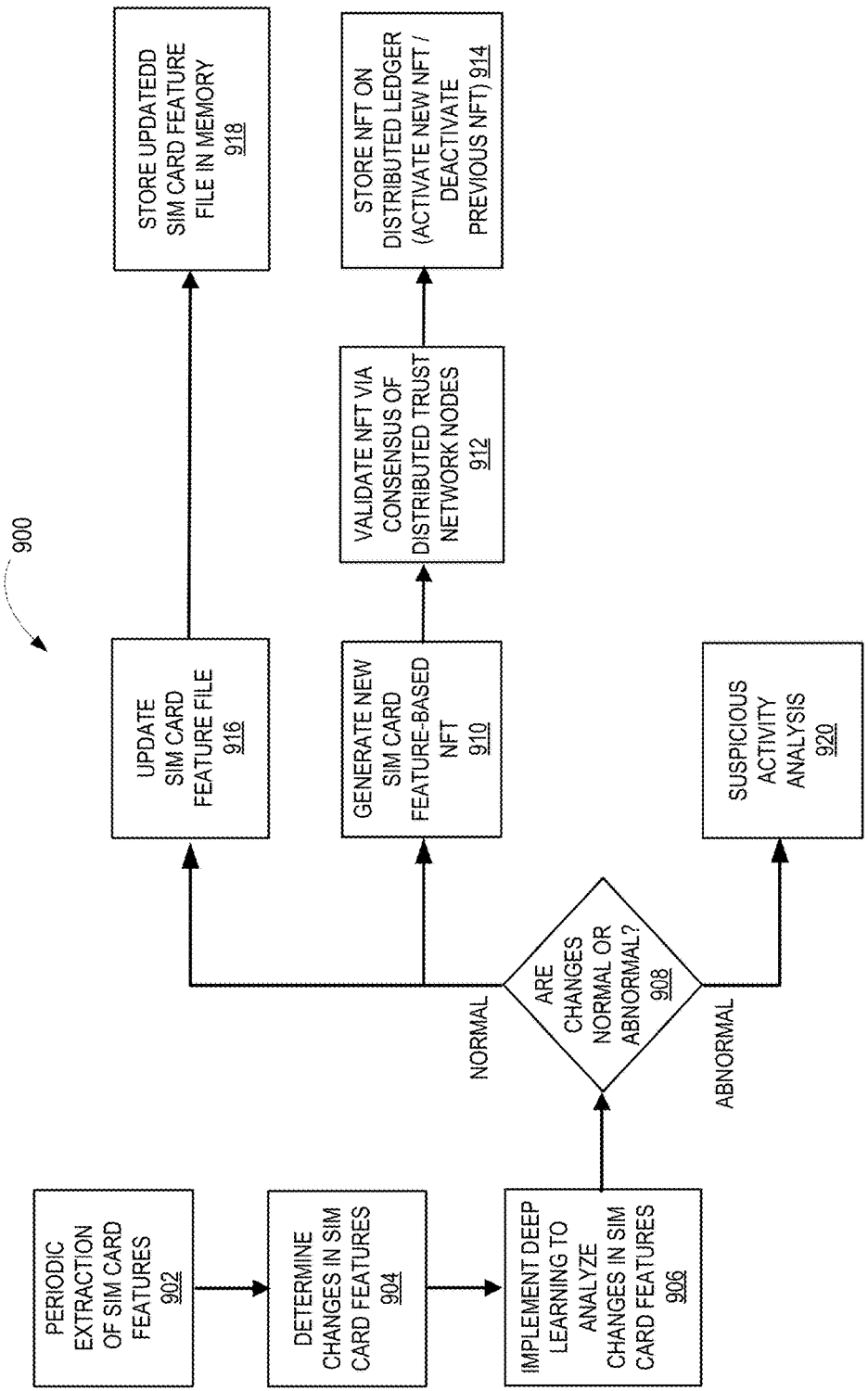
Figure 13:
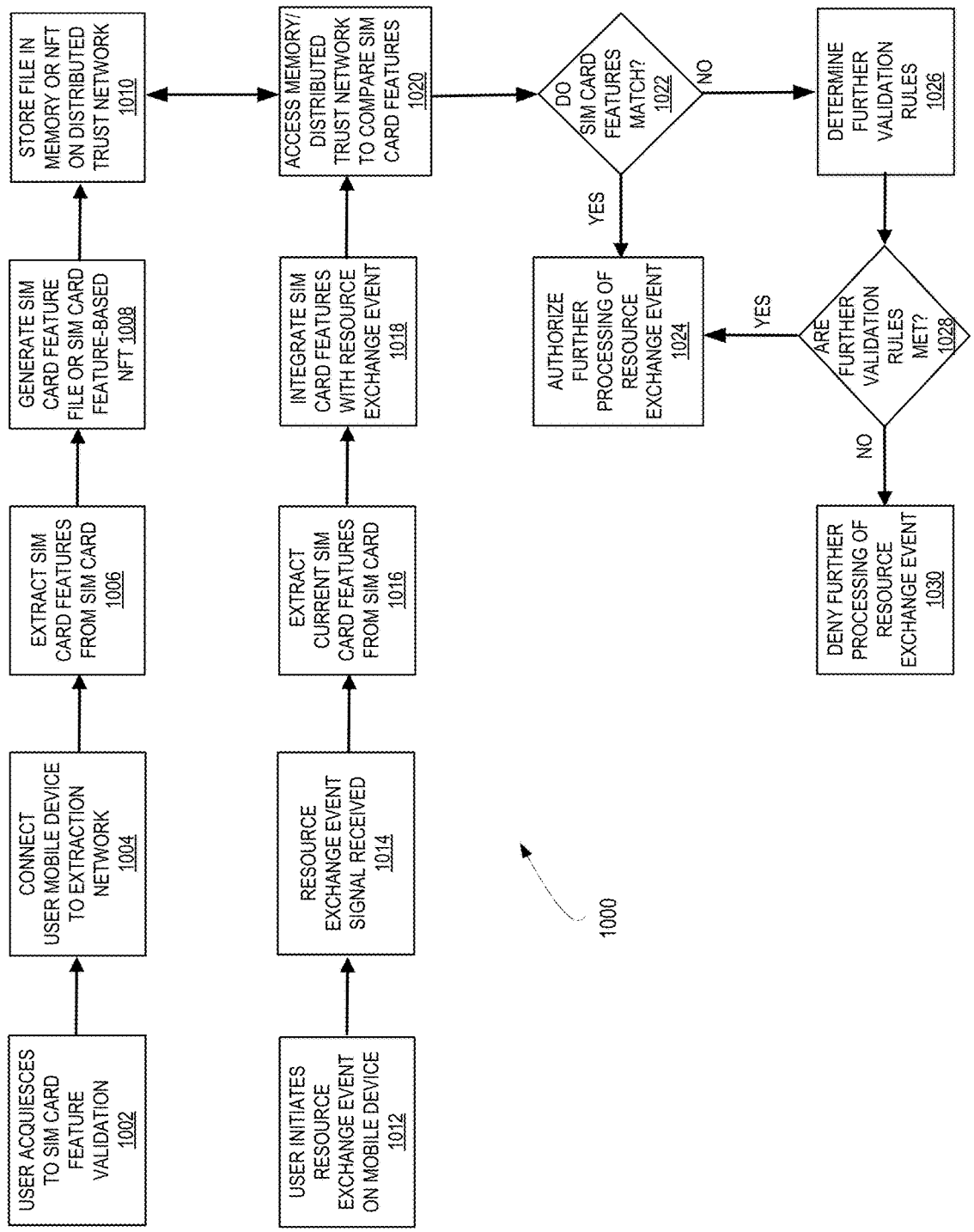
Figure 14:
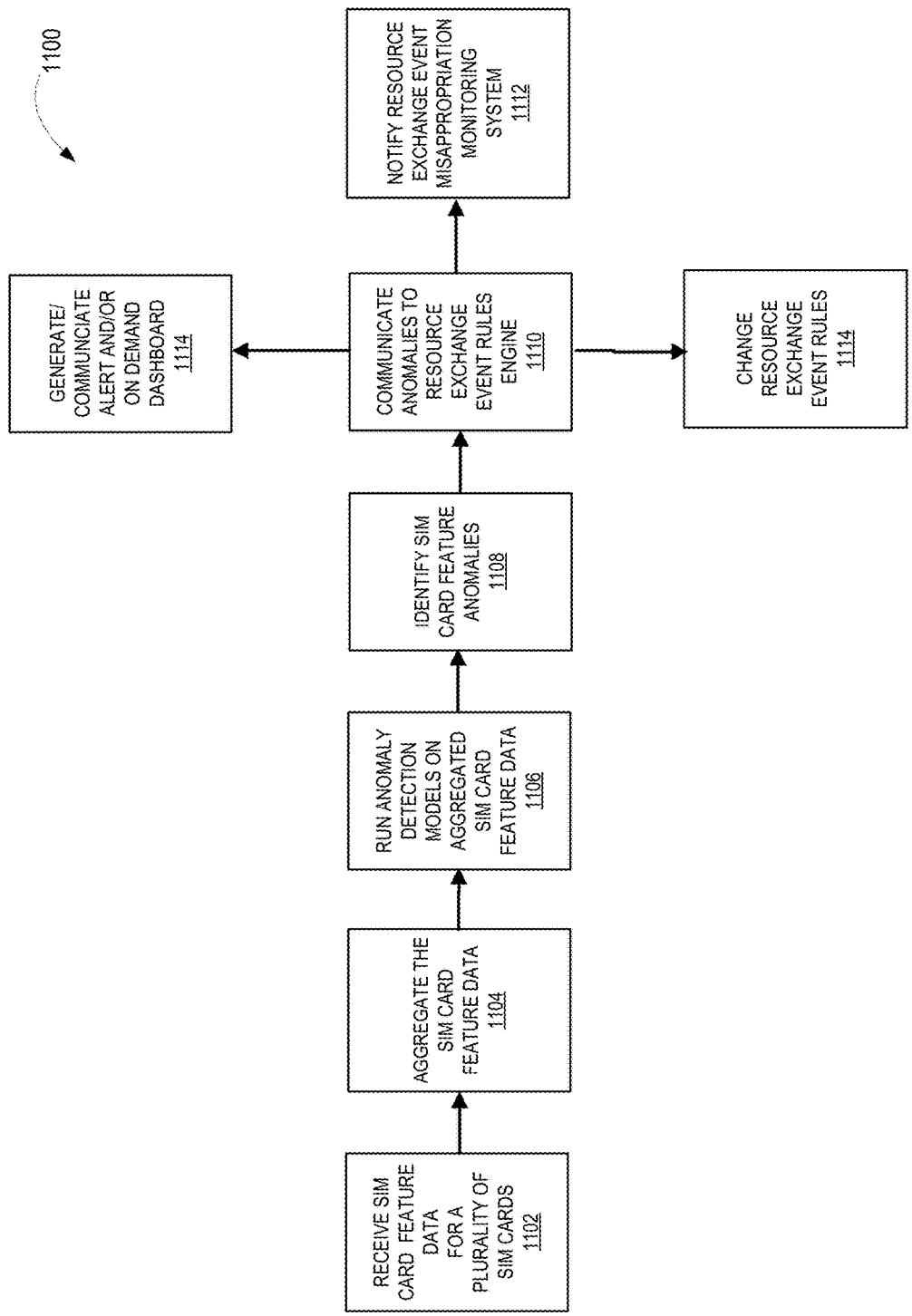
Figure 15:
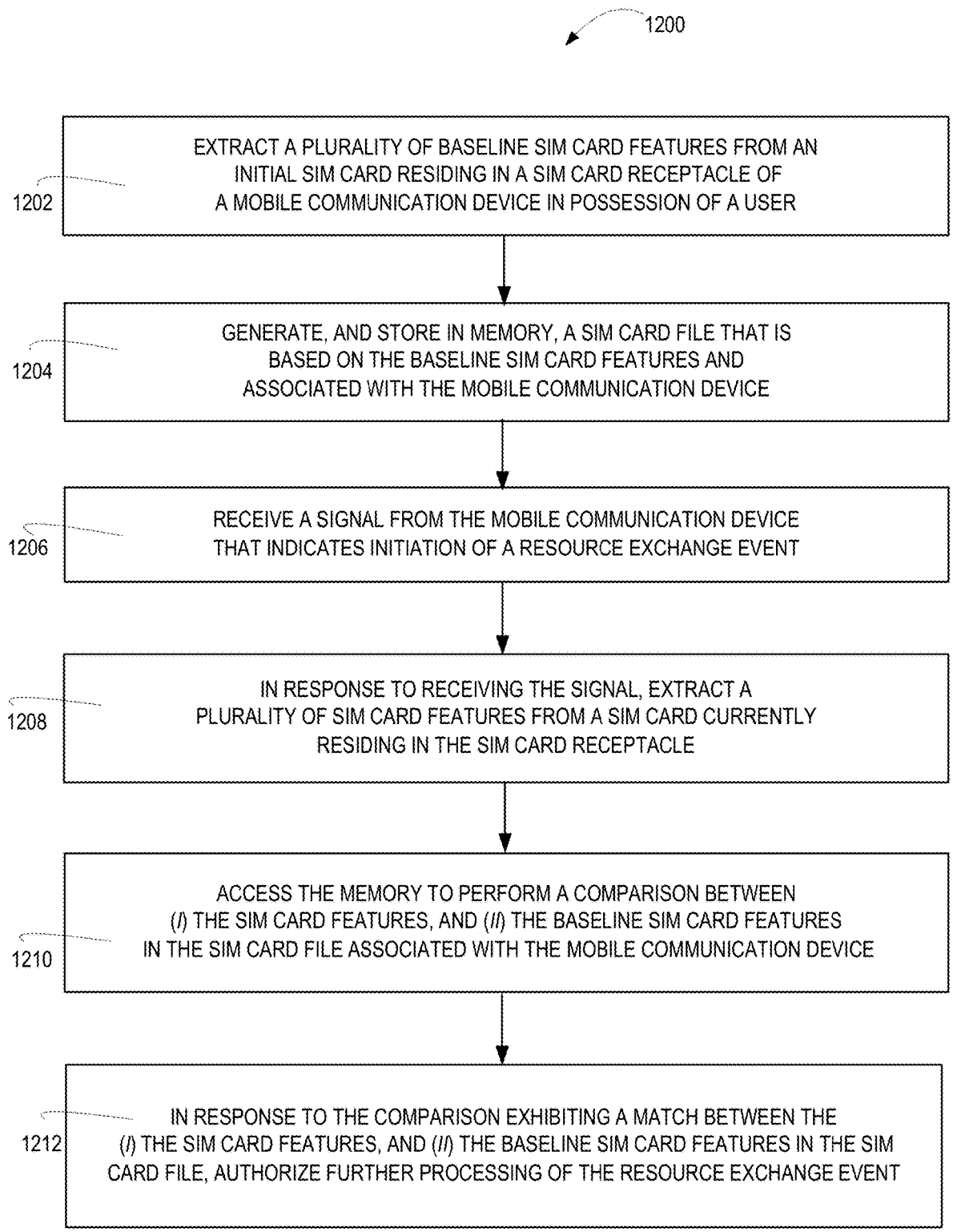
Figure 16:
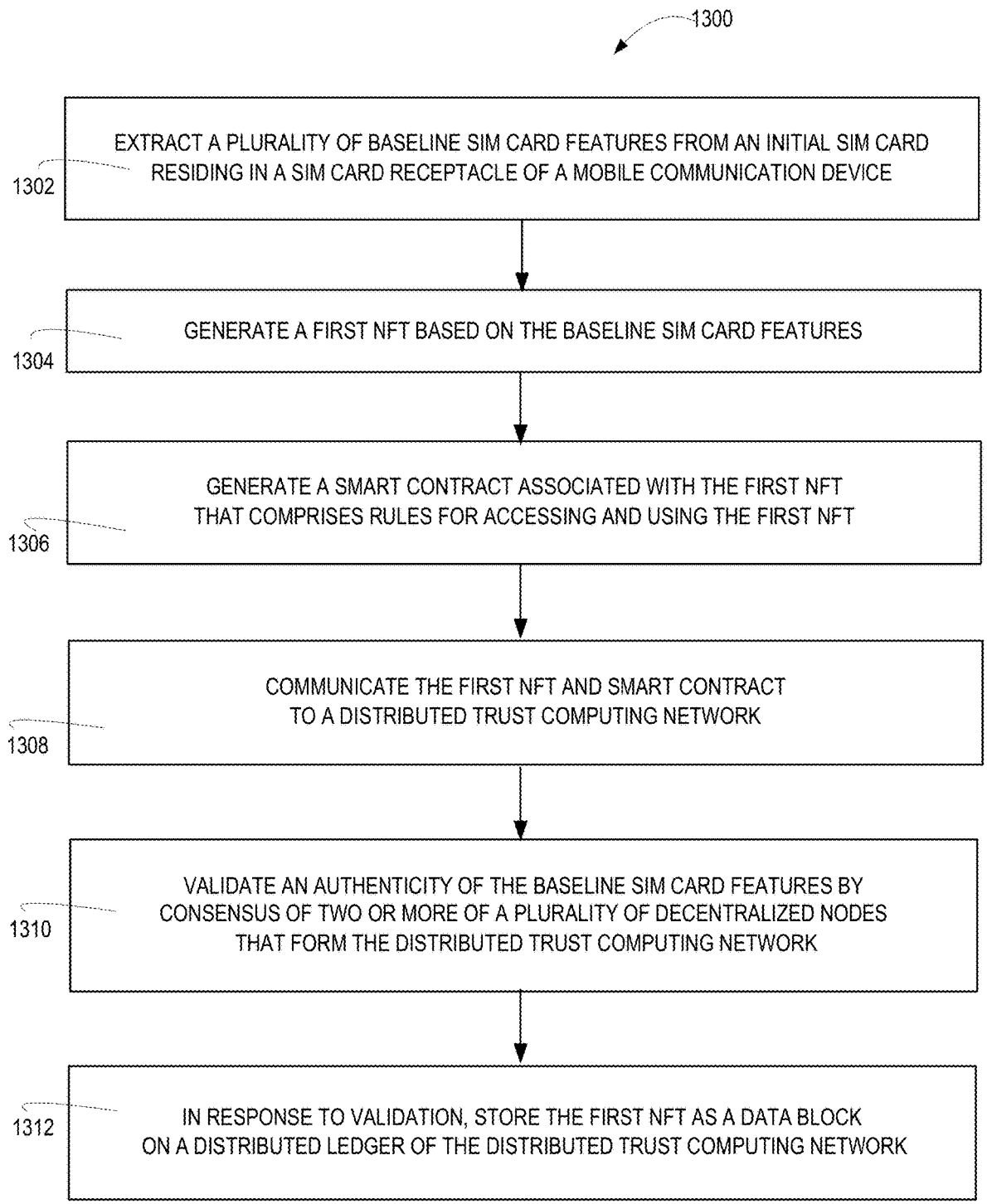

Having thus described embodiments of the disclosure in general terms, reference will now be made to the accompanying drawings, wherein:

FIG. 1 is a schematic diagram of a distributed trust computing network, in accordance with embodiments of the present invention;

FIG. 2 is a block diagram of an event object stored within a distributed ledger of a distributed trust computing network, in accordance with some embodiments of the present disclosure;

FIG. 3 is a schematic diagram of system for generating a Non-Fungible Token (NFT) and storing the NFT within a distributed trust computing network, in accordance with embodiments of the present invention;

FIG. 4 is a block diagram of an architecture for an exemplary NFT; in accordance with embodiments of the present invention;

FIG. 5 is a schematic diagram of a system for Subscriber Identity Module (SIM) card feature-based verification/authorization of a resource exchange event, in accordance with embodiments of the present invention;

FIG. 6 is a schematic/block diagram of a system for generating and verifying a SIM card feature-based Non Fungible Token (NFT); in accordance with embodiments of the present invention;

FIG. 7 is a schematic/block diagram of a system for implementing a SIM card feature-based NFT for verification/authorization of a resource exchange event, in accordance with embodiments of the present invention;

FIG. 8 is a block diagram of a computing platform for extracting SIM card features from a SIM card and storing the features in a SIM card feature file, in accordance with embodiments of the present invention;

FIG. 9 is a block diagram of a computing platform for authorizing/verifying a resource exchange event based on SIM card feature comparison; in accordance with embodiments of the present invention;

FIG. 10 is a block diagram of a computing platform for generating an NFT based on SIM card features and a smart contract, in accordance with embodiment of the present invention;

FIG. 11 is a flow diagram of a method for extraction of SIM card features and storing the features in a SIM card feature file or generating an NFT based on the extracted SIM card features, in accordance with embodiments of the present invention;

FIG. 12 is a flow diagram of a method for periodic extraction of SIM card features from a SIM card and determination of whether changes to the features are normal or abnormal, in accordance with embodiments of the present invention;

FIG. 13 is a flow diagram of a method for authorizing a resource exchange event based on SIM card feature comparison, in accordance with embodiments of the present invention;

FIG. 14 is a flow diagram of a method for analyzing SIM card feature data from multiple different SIM cards to identify anomalies and affect changes in resource exchange event rules in response to the anomalies; in accordance with embodiments of the present invention;

FIG. 15 is a flow diagram of a computer-implemented method for authorizing a resource exchange event based on SIM card feature comparison; in accordance with embodiments of the present invention; and FIG. 16 is a flow diagram of a computer-implemented method for generating and authenticating a SIM card feature-based Non Fungible Token (NFT), in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

As used herein, a "resource" may generally refer to objects, products, devices, real estate, goods, commodities, services, currency and the like, and/or the ability and opportunity to access and use the same in the metaverse. Some example implementations herein contemplate digital property held by a user, including property that is stored and/or maintained by a third-party entity.

As used herein, a "resource exchange event" may refer to any transaction, activities, or communication between one or more entities, or between the user and the one or more entities in dealing with a resource. A resource exchange event may refer to any distribution of resources such as, but not limited to, a payment, processing of funds, purchase of goods or services, a return of goods or services, a payment transaction, a credit transaction, or other interactions involving a user's resource. In some embodiments, the user may authorize a resource exchange using at least a resource transfer instrument (e.g., NFT, credit cards, debit cards, checks, digital wallets, currency, loyalty points), and/or payment credentials (account numbers, resource transfer instrument identifiers). Unless specifically limited by the context, a "resource exchange" a "transaction", "transaction event" or "point of transaction event" may refer to any activity between a user, a merchant (virtual or non-virtual), an entity, or any combination thereof. In some embodiments, a resource exchange or transaction may refer to financial transactions involving direct or indirect movement of funds through electronic transaction processing systems in dealing with a resource.

As used herein, a "non-fungible token" or "NFT" may refer to a digital unit of data used as a unique digital identifier for a resource. An NFT may be stored on a distributed ledger that certifies ownership and authenticity of the resource. For purposes of this invention, a distributed ledger (e.g., blockchain) may be a database that is consensually shared and synchronized across multiple sites, institutions, or geographies, accessible by multiple people. A distributed ledger may be associated with independent computers (referred to as nodes) that record, share and synchronize transactions in their respective electronic ledgers (instead of keeping data centralized as in a traditional ledger). As such, NFTs cannot be copied, substituted, or subdivided. In specific embodiments, the NFT may include at least relationship layer, a token layer, a metadata layer(s), and a licensing layer. The relationship layer may include a map of various users that are associated with the NFT and their relationship to one another. For example, if the NFT is purchased by buyer B1 from a seller S1, the relationship between B1 and S1 as a buyer-seller is recorded in the relationship layer. In another example, if the NFT is owned by O1 and the resource itself is stored in a storage facility by storage provider SP1, then the relationship between O1 and SP1 as owner-file storage provider is recorded in the relationship layer. The token layer may include a smart contract that points to a series of metadata associated with the resource, and provides information about supply, authenticity, lineage, and provenance of the resource. The metadata layer(s) may include resource descriptors that provides information about the resource itself (e.g., resource information). These resource descriptors may be stored in the same metadata layer or grouped into multiple metadata layers. The licensing layer may include any restrictions and licensing rules associated with purchase, sale, and any other types of transfer of the resource from one person to another. Those skilled in the art will appreciate that various additional layers and combinations of layers can be configured as needed without departing from the scope and spirit of the invention.

Thus, systems, apparatus, and methods are described in detail below that providing for Subscriber Identity Module (SIM) card feature-based security credentials and, more specifically, a Non-Fungible Token (NFT) that is generated based on SIM card features.

Specifically, SIM card features, such as communication features, software/hardware features, electrical features, SIM Card behavior features and the like are extracted from the SIM card of a user's mobile communication device and a SIM card feature-based NFT is generated and stored on a distributed trust computing network. In this regard, the distributed trust computing network serves to verify the authenticity of the underlying SIM card features.

In specific embodiments of the invention, the SIM card features are being monitored over time (periodically or, in some instances, continuously) for changes. Deep learning, such as neural networks, are implemented to determine whether the changes are normal changes, which necessitate generation of a new NFT or abnormal changes, indicative of possible SIM card tampering or the like. In other embodiments of the invention, insertion of new SIM card into the mobile communication device is detected and, once verified as being a SIM card authorized for use by the user, SIM card features are extracted and another NFT is generated that is also associated with the user's mobile communication device.

In a specific use case, the SIM card feature-based NFT is used for authentication of a resource exchange event. In this regard, the user's mobile communication device initiates a resource exchange event, and the current SIM card features are extracted, in real-time, from the SIM card currently residing in the mobile communication device. The distributed trust computing network is accessed and the NFT is decrypted to identify the SIM card features used to generate the NFT. The currently extracted SIM card features are compared to the SIM card features used to generate the NFT. The comparison is an intelligent comparison, in that it takes into account, normal changes that may have occurred between the generation of the SIM card feature file and time of the resource exchange event. If the comparison results in no anomalies (i.e., no significant changes), the resource exchange event is deemed to verified/authenticated and further processing may ensue. If the comparison results in anomalies, the resource exchange event may be denied further processing or further resource exchange event authentication rules may be applied. In specific embodiments of the invention the authentication rules that are applied are determined in real-time based on features of the (i) the user, (ii) the mobile device and/or (iii) the resource exchange event.

Turning now to the figures, FIGS. 1 and 2 illustrate an exemplary distributed ledger technology (DLT) architecture implemented in a distributed trust computing network (commonly referred to as a "blockchain" network), in accordance with some of the embodiments of the invention. DLT may refer to the protocols and supporting infrastructure that allow computing devices (peers) in different locations to propose and validate events and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of events represented as event objects that are linked. As event objects each include information about the event object previous to it, they are linked with each additional event object, reinforcing the previously ones stored prior. Therefore, distributed ledgers are resistant to modification of their data because once recorded, the data in any given event object cannot be altered retroactively without altering all subsequent event objects.

To permit events and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or may complement a traditional text-based contract and execute certain provisions, such as conducting an event between Party A to Party B. The computer code of the smart contract itself is replicated across multiple nodes (peers) and, therefore, benefits from the security, permanence, and immutability that a distributed ledger offers. That replication also means that as each new event object is added to the distributed ledger, the code is, in effect, executed. If the parties have indicated, by initiating an event, that certain parameters have been met, the code will execute the step triggered by those parameters. If no such event has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general-purpose deployment of decentralized applications. A distributed ledger may be characterized as a public distributed ledger, a consortium distributed ledger, or a private (i.e., non-public and/or proprietary) distributed ledger. A public distributed ledger is a distributed ledger that any entity can access, communicate events to and expect to see them stored thereon if they nodes of the distributed trust computing network come to a consensus and find the events to be valid. Further, any entity can participate in the consensus process for determining which event objects are valid and, therefore, are added to the distributed ledger and determination of the current state of each event object. A public distributed ledger is generally considered to be fully decentralized. On the other hand, a fully private distributed ledger is a distributed ledger in which permissions are kept centralized with one entity (i.e., the entity that controls/owns the private distributed trust computing network and the private distributed ledgers stored thereon). The permissions may be public or restricted to an arbitrary extent. And lastly, a consortium distributed ledger is a distributed ledger where the consensus process is controlled by a pre-selected set of nodes; for example, a distributed ledger may be associated with a specified number of member institutions, each of which operate in such a way that a quorum of the members must sign every event object in order for the event object to be valid. The right to access such a distributed ledger may be public or restricted to the participants. Consortium distributed ledgers may be considered partially decentralized.

As shown in FIG. 1, an exemplary distributed trust computing network 100 includes a distributed ledger 104 being maintained on multiple devices (nodes) 102 that are authorized to keep track of the distributed ledger 104. For example, the nodes 102 may be one or more computing devices such as a comprehensive computing system and one or more client device(s). Each node 102 in the distributed trust computing network 100 may have a complete or partial copy of the entire distributed ledger 104 or set of events and/or event objects 104-A on the distributed ledger 104. Events are initiated at a node and communicated to the various nodes in the distributed trust computing network 100. Any of the nodes 102 can validate an event, record the event to its copy of the distributed ledger 104, and/or broadcast the event, the validation of the event (in the form of an event object) and/or other data to other nodes 102.

As shown in FIG. 2, an exemplary event object 104-A includes an event header 106 and an event object data 108. The event header 106 may include a cryptographic hash of the previous event object 106-A; a nonce 106-B, i.e., a randomly generated 32-bit whole number; a cryptographic hash of the current event object 106-C wedded to the nonce 106-B; and a time stamp 106-D. The event object data 108 may include event information 108-A being recorded. Once the event object 104-A is generated, the event information 108-A is considered signed and forever tied to its nonce 106-B and hash 106-C. Once generated, the event object 104-A is then deployed on the distributed ledger 104. At this time, a distributed ledger address is generated for the event object 104-A, i.e., an indication of where the event object is located on the distributed ledger 104 and captured for recording purposes. Once deployed, the event information 108-A is considered recorded in the distributed ledger 104.

FIG. 3 illustrates an exemplary process of generating a Non-Fungible Token NFT 200, in accordance with an embodiment of the invention. One of ordinary skill in the art will readily appreciate that an NFT is a cryptographic record (referred to as a "token") that is linked to resources, such as digital objects or the like. An NFT is typically stored on a distributed ledger 104 of a distributed trust computing network 100. The storage of the NFT on the distributed ledger 104 means that various nodes 102 of the distributed trust computing network 100 have reached a consensus as to the ownership and validity/authenticity of the NFT, i.e., the linked data.

As shown in FIG. 3, to generate, otherwise referred to as "minting" an NFT, a user (e.g., NFT owner) may identify, using a user input device 202, resources 204 that the user wishes to mint as an NFT. Typically, the resources 204 used to generate the NFTs are digital objects that represent both tangible and intangible objects. These resources 204 may include a piece of art, music, collectible, virtual world items, videos, real-world items such as artwork and real estate, or any other presumed valuable object. In accordance with embodiments of the present invention, the resources may include Subscriber Identity Module (SIM) card features, such as communication features, electrical features, software/firmware features, hardware features, behavioral features and the like. These resources 204 are then digitized into a proper format to generate the NFT 206. The NFT 206 may be a multi-layered documentation that identifies the resources 204 but also evidences various event conditions associated therewith.

To record the NFT 206 in a distributed ledger 104, an event object 104-A for the NFT 206 is created using data stored in database 208. As previously discussed in relation to FIG. 2, the event object 104-A includes an event object header 106 and an event object data 108. The event object header 106 includes a cryptographic hash of the previous event object, a nonce (i.e., a random 32-bit whole number generated when the event object is created), a cryptographic hash of the current event object wedded to the nonce, and a time stamp. The event object data 108 includes the NFT 206 being recorded. Once the event object 104-A is generated, the NFT 206 is considered signed and persistently tied to its corresponding nonce and hash. The event object 104-A is then deployed in the distributed ledger 104. At this time, a distributed ledger address is generated for the event object 104-A, i.e., an indication of where the NFT 206 is located on the distributed ledger 104 and captured for recording purposes. Once deployed, the NFT 206 is linked permanently to the corresponding hash and the distributed ledger 104, and is considered recorded in the distributed ledger 104, thus concluding the generation/minting process.

As shown in FIG. 3 and previously discussed in relation to FIG. 1, the distributed ledger 104 may be maintained on multiple devices (nodes) 102 of the distributed trust computing network 100; the multiple nodes 102 are authorized to keep track of the distributed ledger 104. For example, the multiple nodes 104 may be computing devices such as a computing system or end-point device(s). Each node 102 may have a complete or partial copy of the entire distributed ledger 104 or set of events and/or event objects on the distributed ledger 104. Events, such as the creation and recordation of a NFT 206, are initiated at a node 102 and communicated to the various nodes 102. Any of the nodes 102 can validate an event, record the event to the corresponding copy of the distributed ledger 104, and/or broadcast the event, its validation (in the form of an event object 104-A) and/or other data to other nodes 102.

FIG. 4 illustrates an exemplary NFT 206 as a multi-layered documentation of a resource 204, in accordance with an embodiment of an invention. As shown in FIG. 4, the NFT 206 may include at least relationship layer 210, a token layer 220, a metadata layer 230, and, when applicable, a licensing layer 240. The relationship layer 210 may include ownership information 212, including a map of various users that are associated with the resource and/or the NFT 206, and their relationship to one another. For example, if the NFT 206 is purchased by buyer B1 from a seller S1, the relationship between B1 and S1 as a buyer-seller is recorded in the relationship layer 210. In another example, if the NFT 206 is owned by O1 and the resource itself is stored in a storage facility by storage provider SP1, then the relationship between O1 and SP1 as owner-file storage provider is recorded in the relationship layer 210. The token layer 220 may include a token identification number 222 that is used to identify the NFT 206. The metadata layer 230 may include at least a file location 232 and a file descriptor 234. The file location 232 provides information associated with the specific location of the resource 204. Depending on the conditions listed in the smart contract underlying the distributed ledger 104, the resource 204 may be stored on-chain, i.e., directly on the distributed ledger 104 along with the NFT 206, or off-chain, i.e., in an external storage location. The file location 232 identifies where the resource 204 is stored. The file descriptor 234 includes specific information associated with the source itself. For example, the file descriptor 234 may include information about the supply, authenticity, lineage, provenance of the resource 204. The licensing layer 240 may include any transferability parameters 242 associated with the NFT 206, such as restrictions and licensing rules associated with purchase, sale, and any other types of transfer of the resource 204 and/or the NFT 206 from one person to another. Those skilled in the art will appreciate that various additional layers and combinations of layers can be configured as needed without departing from the scope and spirit of the invention.

Referring to FIG. 5 a schematic diagram is presented of an exemplary system 300 for authentication/verification of a resource exchange event based on SIM card feature comparison, in accordance with embodiments of the present invention. The system 300 is operable within distributed communication network 310 which may comprise the Intranet, one or more internets, one or more cellular networks and the like. As depicted, the system 300 includes a mobile communication device 400 in possession of a user 402 that includes a Subscriber Identity Module (SIM) card receptacle 410 configured for receiving a SIM card 420. System 300 additionally includes a first computing platform 500 that includes a first memory 502 and one or more first processing devices 504 in communication with the first memory 502. The first memory 502 stores a SIM card feature extraction and file generator engine 510 that is executable by the first processing device(s) 504. The SIM card feature extraction and file generator engine 510 is configured to extract baseline SIM card features 430-1 from an initial SIM card 420-1 received in the SIM card receptacle 410 of the mobile communication device 400. In specific embodiments of the invention user 402 will have previously acquiesced in allowing for the extraction of the SIM card features from the SIM card. In response to extracting the SIM card features, SIM card feature extraction and file generator engine 510 is configured to generate a SIM card feature file 520 that includes the extracted baseline SIM card features 430-1 and store SIM card feature file 520 in first memory 502. In this regard, the SIM card features 430-1 in SIM card feature file 520 act as the so-called "gold standard" for subsequent SIM card feature comparisons.

System 300 additionally includes second computing platform 600 having a second memory 602 and one or more second processing devices 604 in communication with the second memory 602. Second memory 602 stores resource exchange event verification/authorization engine 610 that is executable by the second processing devices 604. Resource exchange event verification/authorization engine 610 is configured to receive a signal 620 originating from the mobile communication device 400 that indicates initiation of a resource exchange event 630. In response to receiving the signal 620, resource exchange event verification/authorization engine 610 is configured to extract SIM card features 430-2 from the current SIM card 420-2 received in the SIM card receptacle 410 of the mobile communication device 400. The current SIM card 420-2 may be the same SIM card from which the baseline SIM card features 430-1 were extracted (i.e., initial SIM card 420-1) or, in those instances in which the SIM card has been changed out, the current SIM card 420-2 may be a different SIM card 420. Resource exchange event verification/authorization engine 610 is further configured to access first memory 502 to perform an intelligent comparison 640 between (i) the currently extracted SIM card features 430-2 and (ii) the baseline SIM card features 430-1. The intelligent comparison 640 allows for taking into account the time between the extraction of the baseline SIM card features 430-1 and the resource exchange event 630 and that certain minor changes to the SIM card features 430 may occur over time. In response to the comparison exhibiting a match 650 between (i) the currently extracted SIM card features 430-2 and (ii) the baseline SIM card features 430-1, resource exchange event verification/authorization engine 610 is configured to authorize 652 further processing of the resource exchange event 630. Based on the aforementioned minor changes that may exist between (i) the currently extracted SIM card features 430-2, and (ii) the baseline SIM card features 430-1 a so-called "match" does not mean that all the features must be the same. Moreover, further processing of the resource exchange event 630 may include further authorization/verification steps or may provide for the resource exchange event to be processed to completion.

Referring to FIG. 6, a schematic/block diagram is presented of a system 320 for authenticating/validating security credentials in the form of SIM card features, in accordance with embodiments of the present invention. The system 320 is operable within distributed communication network 310 which may comprise the Intranet, one or more internets, one or more cellular networks and the like. Similar to the system 300 described in relation to FIG. 1, the system 320 includes a mobile communication device 400 in possession of a user 402 that includes a Subscriber Identity Module (SIM) card receptacle 410 configured for receiving a SIM card 420. System 300 additionally includes a first computing platform 500 that includes a first memory 502 and one or more first processing devices 504 in communication with the first memory 502. The first memory 502 stores a SIM card feature extraction engine 510 that is executable by the first processing device(s) 504. The SIM card feature extraction engine 510 is configured to extract baseline SIM card features 430-1 from an initial SIM card 420-1 received in the SIM card receptacle 410 of the mobile communication device 400. In specific embodiments of the invention user 402 will have previously acquiesced in allowing for the extraction of the SIM card features 430-1 from the SIM card 420-1.

System 320 additionally includes third computing platform 700 having a third memory 702 and one or more third processing devices 704 in communication with the third memory 702. Third memory 702 stores SIM card feature-based NFT and smart contract generator engine 710 that is executable by the third processing device(s) 704 and configured to receiving the baseline SIM card features 430-1 and, in response, generate a first NFT 720 based on the baseline SIM card features 430-1. In specific embodiments of the invention the baseline SIM card features 430-1 serve as at least a part of the input to one or more hash algorithms used to generate first NFT 720. Additionally, SIM card feature-based NFT and smart contract generator engine 710 is configured to generate a smart contract 730 that is associated with first NFT 720 and includes NFT rules 740 for accessing and using first NFT 720. In response to generating first NFT 720 and smart contract 730, SIM card feature-based NFT and smart contract generator engine 710 is configured to communicate first NFT 720 and smart contract 730 to distributed trust computing network 100.

System 320 additionally includes distributed trust computing network 100 which includes a plurality of decentralized nodes 102. Each decentralized node 102 has a memory (not shown in FIG. 6) and one or more processing devices (not shown in FIG. 6). The memory of the decentralized nodes 102 stores a distributed ledger 104, which comprises a plurality of data blocks (not shown in FIG. 6). The distributed trust computing network is configured to receive first NFT 720 and smart contract 730 and, in response, a plurality of the decentralized nodes 102 are configured to validate an authenticity of the first NFT 720 (i.e., validate authenticity of the baseline SIM card features 430-1). In response to validating authenticity of first NFT 720, distributed trust computing network 100 is configured to store first NFT, in an unalterable/immutable state, as a data block on the distributed ledger 104.

Referring to FIG. 7, depicted is a schematic/block diagram of a system 330 for authentication/verification of an event based on comparing SIM card features of a NFT to currently extracted SIM card features, in accordance with embodiments of the present invention. The system 330 is operable within distributed communication network 310 which may comprise the Intranet, one or more internets, one or more cellular networks and the like. As depicted, the system 330 includes a mobile communication device 400 in possession of a user 402 that includes a Subscriber Identity Module (SIM) card receptacle 410 configured for receiving a SIM card 420. System 330 additionally includes a first computing platform 500 that includes a first memory 502 and one or more first processing devices 504 in communication with the first memory 502. The first memory 502 stores a SIM card feature extraction 510 that is executable by the first processing device(s) 504. The SIM card feature extraction engine 510 is configured to extract baseline SIM card features 430-1 from an initial SIM card 420-1 received in the SIM card receptacle 410 of the mobile communication device 400. In specific embodiments of the invention user 402 will have previously acquiesced in allowing for the extraction of the SIM card features from the SIM card.

System 330 additionally includes third computing platform 700 having a third memory 702 and one or more third processing devices 704 in communication with the third memory 702. Third memory 702 stores SIM card feature-based NFT and smart contract generator engine 710 that is executable by the third processing device(s) 704 and configured to receiving the baseline SIM card features 430-1 and, in response, generate a first NFT 720 based on the baseline SIM card features 430-1. In specific embodiments of the invention the baseline SIM card features 430-1 serve as at least a part of the input to one or more hash algorithms used to generate first NFT 720. Additionally, SIM card feature-based NFT and smart contract generator engine 710 is configured to generate a smart contract 730 that is associated with first NFT 720 and includes NFT rules 740 for accessing and using first NFT 720. In response to generating first NFT 720 and smart contract 730, SIM card feature-based NFT and smart contract generator engine 710 is configured to communicate first NFT 720 and smart contract 730 to distributed trust computing network 100.

System 330 additionally includes distributed trust computing network 100 which includes a plurality of decentralized nodes 102. Each decentralized node 102 has a memory (not shown in FIG. 6) and one or more processing devices (not shown in FIG. 6). The memory of the decentralized nodes 102 stores a distributed ledger 104, which comprises a plurality of data blocks (not shown in FIG. 6). The distributed trust computing network is configured to receive first NFT 720 and smart contract 730 and, in response, a plurality of the decentralized nodes 102 are configured to validate an authenticity of the first NFT 720 (i.e., validate authenticity of the baseline SIM card features 430-1). In response to validating authenticity of first NFT 720, distributed trust computing network 100 is configured to store first NFT, in an unalterable/immutable state, as a data block on the distributed ledger 104.

System 330 additionally includes second computing platform 600 (shown in detail in FIG. 5) having a second memory 602 and one or more second processing devices 604 in communication with the second memory 602. Second memory 602 stores event verification/authorization engine 610 that is executable by the second processing devices 604. Event verification/authorization engine 610 is configured to receive a signal 620 originating from the mobile communication device 400 that indicates initiation of an event 630, which may be a resource exchange event or any other event warranting authentication/validation. In response to receiving the signal 620, event verification/authorization engine 610 is configured to extract SIM card features 430-2 from the current SIM card 420-2 received in the SIM card receptacle 410 of the mobile communication device 400. The current SIM card 420-2 may be the same SIM card from which the baseline SIM card features 430-1 were extracted (i.e., initial SIM card 420-1) or, in those instances in which the SIM card has been changed out, the current SIM card 420-2 may be a different SIM card 420. Resource exchange event verification/authorization engine 610 is further configured to, in accordance with smart contract 730, access the distributed ledger 104 of distributed trust computing network 102 to perform an intelligent comparison 640 between (i) the currently extracted SIM card features 430-2 and (ii) the baseline SIM card features 430-1 used to generate first NFT 720. The intelligent comparison 640 allows for taking into account the time between the extraction of the baseline SIM card features 430-1 and the resource exchange event 630 and that certain minor changes to the SIM card features 430 may occur over time. In response to the comparison exhibiting a match 650 between (i) the currently extracted SIM card features 430-2 and (ii) the baseline SIM card features 430-1, event verification/authorization engine 610 is configured to authorize 652 further processing of the event 630. Based on the aforementioned minor changes that may exist between (i) the currently extracted SIM card features 430-2, and (ii) the baseline SIM card features 430-1 a so-called "match" does not mean that all the features must be the same. Moreover, further processing of the event 630 may include further authorization/verification steps or may provide for the event to be processed to completion.

Referring to FIG. 8, a block diagram is depicted of first computing platform 500, in accordance with embodiments of the present invention. In addition to providing greater detail, FIG. 8 highlights various alternate embodiments of the systems 300, 320 and 330. First computing platform 500 comprises one or more computing devices/apparatus, such as application server(s), storage servers or the like configured to execute software programs, including instructions, engines, algorithms, modules, routines, applications, tools, and the like. First computing platform 500 includes first memory 502, which may comprise volatile and non-volatile memory, such as read-only and/or random-access memory (RAM and ROM), EPROM, EEPROM, flash cards, or any memory common to computer platforms). Moreover, first memory 502 may comprise cloud storage, such as provided by a cloud storage service and/or a cloud connection service.

Further, first computing platform 500 also includes first processing device(s) 504, which may be an application-specific integrated circuit ("ASIC"), or other chipset, logic circuit, or other data processing device. First processing device 504 may execute an application programming interface ("API") 506 that interfaces with any resident programs, such as SIM card extraction and file generation engine 510 and SIM card feature anomaly detection engine 560 and sub-engines/routines associated therewith or the like stored in the first memory 502 of the first computing platform 500.

First processing device 504 may include various processing subsystems (not shown in FIG. 8) embodied in hardware, firmware, software, and combinations thereof, that enable the functionality of first computing platform 500 and the operability of first computing platform 500 on distributed communication network 310 (shown in FIGS. 5-7). For example, processing subsystems allow for initiating and maintaining communications and exchanging data with other networked devices. For the disclosed aspects, processing subsystems of first processing device 504 may include any subsystem used in conjunction with SIM card extraction and file generation engine 510 and SIM card feature anomaly detection engine 560 and related sub-engines/routines, algorithms, sub-algorithms, modules, sub-modules thereof.

First computing platform 500 additionally includes a communications module (not shown in FIG. 8) embodied in hardware, firmware, software, and combinations thereof, that enables electronic communications between first computing platform 500 and other networks and/or networked devices, such as, second computing platform 600, third computing platform 700, distributed trust computing network 100 and mobile communication device 400. Thus, the communication module may include the requisite hardware, firmware, software and/or combinations thereof for establishing and maintaining a network communication connection with one or more systems, platforms, networks, or the like.

As previously discussed in relation to FIG. 5, first memory 502 of first computing platform 500 stores a SIM card feature extraction and file generator engine 510 that is executable by the first processing device(s) 504. The SIM card feature extraction and file generator engine 510 is configured to extract baseline SIM card features 430-1 from an initial SIM card 420-1 received in the SIM card receptacle 410 of the mobile communication device 400. In specific embodiments of the invention user 402 will have previously acquiesced in allowing for the extraction of the SIM card features from the SIM card. The SIM card features 430 may include, but are not limited to, communication features 432, software/firmware features 433, hardware features 434, electrical features 435, behavioral features 436 (i.e., interaction with mobile communication device 400). Communication features 432 may include, but are not limited to, Integrated Circuit Card Identification (ICCID) number, International Mobile Subscriber Identity (IMSI) number, authentication key ($K_j$), Local Area Identity (LAI), operator-specific emergency number. In addition, communication features may include carrier-specific data such as, but not limited to, Short Message Service Center (SMSC) number, Service Provider Name (SPN), Service Dialing Number(s) (SDN), Value-Added Service (VAS) applications and the like. Software/firmware features 433 may include the name or other identifier of any software or firmware stored or included in the SIM card 420. Hardware features 434 may include any physical features, such as, but not limited to, dimensional features, weight, card format and the like. Electrical features 435 may include performance features such, as but not limited to operating voltage, voltage programming power and the like. Behavioral features 436 will be dependent upon the type of mobile communication device 400 and include interactions performed with the mobile communication device 400.

In response to extracting the baseline SIM card features 430-1, SIM card feature extraction and file generator engine 510 is configured to generate a SIM card feature file 520 that includes the extracted baseline SIM card features 430-1 and store SIM card feature file 520 in first memory 502. In this regard, the SIM card features 430-1 in SIM card feature file 520 act as the so-called "gold standard" for subsequent SIM card feature comparisons.

In alternate embodiments of the invention, SIM card feature extraction and file generator engine 510 includes SIM card removal/insertion detection 530 that is configured to detect at least one of SIM card removal 532 or SIM card insertion from/into the SIM card receptacle 410 of the mobile communication device 400. In response to detection of SIM card insertion 534, SIM card feature extraction and file generator engine 510 is further configured to extract baseline SIM card features 430-2 from the SIM card 420-2 (which will typically be another SIM card different from the initial SIM card). In response to extracting the baseline SIM card features 430-2 from the subsequent SIM card 420-2, SIM card feature extraction and file generator engine 510 is configured to either generate a second SIM card file 520-2 that includes the baseline SIM card features 430-2 of the subsequent SIM card 420-2 or provide updating 520-3 the existing SIM card file 520-1 with baseline SIM card features 430 of another SIM card 420 that is associated with the mobile communication device 400.

In other alternate embodiments of the invention, SIM card feature extraction and file generator engine 510 is configured for periodic extraction 540 of SIM card features 430-3. Such periodic SIM card feature extraction 540 may occur on a predetermined schedule (e.g., once every week, month or the like) or on-demand. In response to the extraction 540, SIM card feature extraction and file generator engine 510 is configured to determine changes 550 between the currently extracted baseline SIM card features 430-3 and the baseline SIM card features 430-1 in the SIM card file 520-1. In response to determining changes 550, SIM card feature extraction and file generator engine 510 is configured to render and store in first memory 502 updated SIM card file 520-3 which reflects the determined changes 550 to the baseline SIM card features 430.

In specific embodiments of the invention, first memory 502 stores SIM card anomaly detection engine 560 that implements one or more deep learning algorithms, such as an RNN-LSTM (Recurrent Neural Network-Long Short Term Memory) neural network or the like to analyze previously determined changes 550 in the SIM card features 430 to determine which of the changes 550 are indicative of normal SIM card behavior 570 and which of the changes 550 are indicative of abnormal SIM card behavior 580. If all of the changes are determined to be indicative of normal SIM card behavior, the SIM card file 520 is updated 530-1 accordingly. However, if one or more of the changes 550 are determined to be indicative of abnormal SIM card behavior 580 (i.e., a so-called "anomaly"), one or more suspicious activity actions are implemented, which may include generating and communicating one or more alerts to designated entities or taking actions at the mobile communication device level, including locking the mobile communication device until further investigative actions can be taken, providing limited use of the mobile communication device until further investigative actions can be taken or the like.

Referring to FIG. 9, a block diagram is depicted of second computing platform 600, in accordance with embodiments of the present invention. In addition to providing greater detail, FIG. 9 highlights various alternate embodiments of the systems 300 and 330. Second computing platform 600 comprises one or more computing devices/apparatus, such as application server(s), storage servers or the like configured to execute software programs, including instructions, engines, algorithms, modules, routines, applications, tools, and the like. Second computing platform 600 includes second memory 602, which may comprise volatile and non-volatile memory, such as read-only and/or random-access memory (RAM and ROM), EPROM, EEPROM, flash cards, or any memory common to computer platforms). Moreover, second memory 602 may comprise cloud storage, such as provided by a cloud storage service and/or a cloud connection service.

Further, second computing platform 600 also includes second processing device(s) 604, which may be an application-specific integrated circuit ("ASIC"), or other chipset, logic circuit, or other data processing device. Second processing device 604 may execute an application programming interface ("API") 606 that interfaces with any resident programs, such as resource exchange event verification engine 610 and resource exchange event validation rules engine and sub-engines/routines associated therewith or the like stored in the second memory 602 of the second computing platform 600.

Second processing device 604 may include various processing subsystems (not shown in FIG. 9) embodied in hardware, firmware, software, and combinations thereof, that enable the functionality of second computing platform 600 and the operability of second computing platform 600 on distributed communication network 310 (shown in FIGS. 5-7). For example, processing subsystems allow for initiating and maintaining communications and exchanging data with other networked devices. For the disclosed aspects, processing subsystems of second processing device 604 may include any subsystem used in conjunction with resource exchange event verification engine 610 and resource exchange event validation rules engine 670 and related sub-engines/routines, algorithms, sub-algorithms, modules, sub-modules thereof.

Second computing platform 600 additionally includes a communications module (not shown in FIG. 9) embodied in hardware, firmware, software, and combinations thereof, that enables electronic communications between second computing platform 600 and other networks and/or networked devices, such as, first computing platform 500, third computing platform 700, distributed trust computing network 100 and mobile communication device 400. Thus, the communication module may include the requisite hardware, firmware, software and/or combinations thereof for establishing and maintaining a network communication connection with one or more systems, platforms, networks, or the like.

As previously discussed in relation to FIG. 5, second memory 602 of second computing platform 600 stores resource exchange event verification/authorization engine 610 that is executable by the second processing devices 604. Resource exchange event verification/authorization engine 610 is configured to receive a signal 620 originating from the mobile communication device 400 that indicates initiation of a resource exchange event 630. In response to receiving the signal 620, resource exchange event verification/authorization engine 610 is configured to extract SIM card features 430-2 from the current SIM card 420-2 received in the SIM card receptacle 410 of the mobile communication device 400. The current SIM card 420-2 may be the same SIM card from which the baseline SIM card features 430-1 were extracted (i.e., initial SIM card 420-1) or, in those instances in which the SIM card has been changed out, the current SIM card 420-2 may be a different SIM card 420. Resource exchange event verification/authorization engine 610 is further configured to access first memory 502 to perform an intelligent comparison 640 between (i) the currently extracted SIM card features 430-2 and (ii) the baseline SIM card features 430-1. In response to the comparison exhibiting a match 650 between (i) the currently extracted SIM card features 430-2 and (ii) the baseline SIM card features 430-1, resource exchange event verification/authorization engine 610 is configured to authorize 652 further processing of the resource exchange event 630.

In further embodiments of the invention, in response to the comparison not exhibiting a match 650 between (i) the currently extracted SIM card features 430-2 and (ii) the baseline SIM card features 430-1, resource exchange event verification/authorization engine 610 is configured to deny authorization 662 or apply 664 further validation rules 680. In specific embodiments of the invention, memory 602 of second computing platform 610 stores resource exchange event validation rules engine 670, which is executable by the second processing device(s) 604 and configured to determine, in real-time, one or more validation rules 680 to further apply 664 to the resource exchange event 630 based on attributes associated with at least one of (i) the user 680-1, (ii) the mobile communication device 680-2, and (iii) the resource exchange event 680-3. For example, the location of the user and/or mobile communication device, the volume of resources being exchanged in the resource exchange event, the time of day of the resource exchange event and the like all may factor in when determining further validation rules 680 that need to be applied 664.

Referring to FIG. 10, a block diagram is depicted of third computing platform 700, in accordance with embodiments of the present invention. In addition to providing greater detail, FIG. 10 highlights various alternate embodiments of the systems 320 and 330. Third computing platform 700 comprises one or more computing devices/apparatus, such as application server(s), storage servers or the like configured to execute software programs, including instructions, engines, algorithms, modules, routines, applications, tools, and the like. Third computing platform 700 includes third memory 702, which may comprise volatile and non-volatile memory, such as read-only and/or random-access memory (RAM and ROM), EPROM, EEPROM, flash cards, or any memory common to computer platforms). Moreover, third memory 702 may comprise cloud storage, such as provided by a cloud storage service and/or a cloud connection service.

Further, third computing platform 700 also includes third processing device(s) 704, which may be an application-specific integrated circuit ("ASIC"), or other chipset, logic circuit, or other data processing device. Third processing device 704 may execute an application programming interface ("API") 706 that interfaces with any resident programs, such as SIM card feature-based NFT and smart contract generator engine 710 and SIM card feature anomaly detection engine 770 and sub-engines/routines associated therewith or the like stored in third memory 702 of the third computing platform 700.

Third processing device 704 may include various processing subsystems (not shown in FIG. 10) embodied in hardware, firmware, software, and combinations thereof, that enable the functionality of third computing platform 700 and the operability of third computing platform 700 on distributed communication network 310 (shown in FIGS. 6-7). For example, processing subsystems allow for initiating and maintaining communications and exchanging data with other networked devices. For the disclosed aspects, processing subsystems of third processing device 704 may include any subsystem used in conjunction with SIM card feature-based NFT and smart contract generator engine 710 and SIM card feature anomaly detection engine 770 and related sub-engines/routines, algorithms, sub-algorithms, modules, sub-modules thereof.

Third computing platform 700 additionally includes a communications module (not shown in FIG. 10) embodied in hardware, firmware, software, and combinations thereof, that enables electronic communications between third computing platform 700 and other networks and/or networked devices, such as, first computing platform 500, second computing platform 600, distributed trust computing network 100 and mobile communication device 400. Thus, the communication module may include the requisite hardware, firmware, software and/or combinations thereof for establishing and maintaining a network communication connection with one or more systems, platforms, networks, or the like.

As previously discussed in relation to FIG. 6, third memory 702 of third computing platform 700 stores SIM card feature-based NFT and smart contract generator engine 710 that is executable by the third processing device(s) 704. SIM card feature-based NFT and smart contract generator engine 710 is configured to receive baseline SIM card features 430-1 that have been extracted from an initial SIM card 420-1. As previously discussed, the SIM card features 430 may include, but are not limited to, communication features 432, software/firmware features 433, hardware features 434, electrical features 435, behavioral features 436 (i.e., interaction with mobile communication device 400) and the like. In response to receiving the baseline SIM card features 430-1, SIM card feature-based NFT and smart contract generator engine 710 is configured to generate a first NFT 720 based on the baseline SIM card features 430-1.

In specific embodiments of the invention the baseline SIM card features 430-1 serve as at least a part of the input to one or more hash algorithms used to generate first NFT 720. Additionally, SIM card feature-based NFT and smart contract generator engine 710 is configured to generate a smart contract 730 that is associated with first NFT 720 and includes NFT rules 740 for accessing and using first NFT 720. In response to generating first NFT 720 and smart contract 730, SIM card feature-based NFT and smart contract generator engine 710 is configured to communicate first NFT 720 and smart contract 730 to distributed trust computing network 100.

In other alternate embodiments of the invention, in which SIM card feature extraction and file generator engine 510 of first computing platform 500 is configured for periodic extraction 540 of SIM card features 430-2 and determine changes 550 between the currently extracted baseline SIM card features 430-2 and the baseline SIM card features 430-1 in the SIM card file 520-1, SIM card feature-based NFT and smart contract generator engine 710 is configured to generate a second NFT 722 based on the changed baseline SIM card features 430-2 and communicate second NFT 722 to distributed trust computing network 100 for subsequent authentication verification of the baseline SIM card features 430-2 and storage within the distributed ledger 104. In such embodiments of the invention, in accordance with smart contract 730, the first NFT, or whichever NFT is currently activated, is deactivated and the second NFT is activated.

In other alternate embodiments of the invention, in which SIM card feature extraction and file generator engine 510 of first computing platform 500 includes SIM card removal/insertion detection 530, in response to detection of SIM card insertion 534 and extraction baseline SIM card features 430-2 from the SIM card 420-2, SIM card feature-based NFT generator engine 710 is configured to either generate a third NFT 724 based on the current baseline SIM card features 430-3 and communicate third NFT 724 to distributed trust computing network 100 for subsequent authentication verification of the baseline SIM card features 430-3 and storage within the distributed ledger 104. In such embodiments of the invention, in accordance with smart contract 730, the first NFT, or whichever NFT is currently activated, is deactivated and the third NFT is activated.

Referring to FIG. 11, depicted is a flow diagram of methods 800 for capturing and storing SIM card features, in accordance with embodiments of the present invention. At Event 802, SIM card features are initially extracted from a SIM card inserted into a user's mobile communication device. Such extraction may be prompted by the user agreeing to allow SIM card features as a means of authentication/validation.

According to specific embodiments of the invention, extraction of the SIM card features triggers, at Event 808, generation of a SIM card feature-based Non-Fungible Token (NFT). The NFT may be generated by using the SIM card features as at least a portion of the input to the hash algorithms used for NFT generation. Additionally, inputs may include digital content, such as image(s), audio, video or the like. In response to generating the SIM card feature-based NFT, at Event 810, a smart contract is generated that is associated with the NFT and provides for access/use rules as between the contractual parties (i.e., the user and the entity using the NFT for authentication/validation purposes). In response to communicating the NFT to a designated distributed trust computing network, at Event 812, the NFT is validated (i.e., the SIM card features are deemed to be authentic) via consensus of a plurality of the nodes of the distributed trust computing network. In response to NFT validation, at Event 814 the NFT is stored on a distributed ledger of, or in communication with, the distributed trust computing network. In the event that the SIM card features are changed or that different SIM cards are used in the mobile communication device, additional NFTs will be generated, authenticated and stored via the distributed trust computing network.

According to other specific embodiments of the invention, extraction of the SIM card features triggers, at Event 808, generation of a SIM card feature file 804 that includes the extracted SIM card features. At Event 806, the SIM card feature file is stored in memory, such as a SIM card feature file database or the like. In the event that the SIM card features are changed or that different SIM cards are used in the mobile communication device, the SIM card feature file is updated to reflect the changes or additional SIM card or an additional SIM card feature file may be generated.

Referring to FIG. 12, a flow diagram is depicted of a methods 900 for periodic extraction of SIM card features, in accordance with embodiments of the present invention. Once the initial SIM card features have been extracted, SIM card features will need to be extracted periodically (either on a fixed schedule or on-demand) to ensure that the SIM card features used for comparison purposes are up-to-date and accurate. At Event 902, periodic extraction of the SIN card features occurs and, at Event 904, the currently extracted SIM card features are compared to the SIM card features in the current SIM card feature file or active NFT to determine changes in the SIM card features.

At Event 906, one or more deep learning algorithms, such as neural network or the like is implemented to analyze the changes in the SIM card features and, at Decision 908, a determination is made as to whether the changes are indicative of normal change behavior or whether one or more of the changes are indicative of abnormal change behavior. If any of the changes are determined to be indicative of abnormal change behavior, at Event 920, further suspicious activity analysis is performed and actions taken, such as generating and communicating alerts or the like.

In specific embodiments of the invention, if all of the changes are determined to be indicative of normal change behavior, at Event 910, a new SIM card feature-based NFT is generated and communicated to the distributed trust computing network. At Event 912, the new NFT is validated (i.e., the SIM card features are deemed to be authentic) via consensus of a plurality of the nodes of the distributed trust computing network. In response to NFT validation, at Event 914 the NFT is activated and stored on a distributed ledger of, or in communication with, the distributed trust computing network and the previous (which may be the initial NFT or any subsequent currently activated NFT) is deactivated.

In other specific embodiments of the invention, if all of the changes are determined to be indicative of normal change behavior, at Event 916, the SIM card feature file is updated to reflect the changes in the SIM card features and, at Event 918, the updated SIM card feature file is stored in memory.

Referring to FIG. 13, a flow diagram is depicted of a method 1000 for SIM card feature-based validation/authorization of a resource exchange event, in accordance with embodiments of the present invention. At Event 1002, a user acquiesces to SIM card feature validation of resource exchange events. In certain instances, user agreement is necessary as the features may contain user data. In response to the user acquiescing, at Event 1004, the mobile communication device is provided network connection to an extraction engine/entity and, at Event 1006, the initial SIM card features are extracted from the SIM card currently residing in the user's mobile communication device. In response to extracting the SIM card features, at Event 1008, a SIM card feature file is generated or, in alternate embodiments, a SIM card feature-based NFT is generated and, at Event 1010, the SIM card feature file is stored in memory, or, alternatively, the NFT is validated and stored at a distributed trust computing network.

At Event 102, the user initiates a resource exchange event on the mobile communication device, such as a purchase transaction or transfer of funds amongst financial accounts or the like. In response, at Event 1014, a resource exchange event signal is communicated and received by a resource exchange event validation/authentication and processing entity. In response to receiving the signal, at Event 1016, SIM card features are extracted, in real-time, from the SIM card currently residing in the mobile communication device and, at Event 1018 the SIM card features are integrated with the resource exchange event authorization process. At Event 1020, the memory or distributed trust computing network is accessed so that the stored SIM card features can be compared to the currently extracted SIM card features and, at Decision 1022, an intelligent determination is made as to whether the SIM card features match (i.e., satisfy rules that indicate that the stored SIM card features and the currently extracted SIM card features are adequately similar so as to grant authorization/validation). If the SIM card features are determined to match, at Event 1024, further processing of the resource exchange event is authorized.

If the SIM card are determined to not match, at Event 1026, further validation rules may be determined/identified based on attributes associated with at least one of (i) the user, (ii) the mobile communication device and/or (iii) the resource exchange event. At Decision 1028, a determination is made as to whether the further validation rules have been met. If the further validation rules have been met, at Event 1024, further processing of the resource exchange event is authorized. If the further validation rules have not been met, at Event 1024, further processing of the resource exchange event is denied.

Referring to FIG. 14, a flow diagram is depicted of a method 1100 for analyzing SIM card feature data from a plurality of users to determine anomalies, in accordance with embodiments of the present invention. At Event 1102, SIM card feature data is received for a plurality of SIM cards. The plurality of SIM cards may be associated with a single user, a single mobile communication device or, in most instances, multiple different users and/or mobile communication devices. At Event 1104, the SIM card feature data is aggregated for analysis purposes and, at Event 1106, anomaly detection models are executed on the aggregated SIM card feature data. As a result of executing the anomaly detection models, at Event 1108, SIM card feature anomalies are identified and, at Event 1110, the anomalies are communicated to a resource exchange event rules engine, which, at Event 114, is configured to change/adjust rules for validating resource exchange events based on the identified anomalies. Moreover, as needed, at Event 1112, notifications are generated and communicated to resource exchange event misappropriation monitoring systems and, at Event 1114, alerts are generated and communicated to predetermined parties and/or an on-demand dashboard used for monitoring SIM card feature anomalies and other indices affecting resource exchange event misappropriation.

Referring to FIG. 15, a flow diagram is presented of a computer-implemented method 1200 for authorizing a resource exchange event based on a SIM card feature comparison, in accordance with embodiments of the present invention. At Event 1202, a plurality of baseline SIM card features are extracted from an initial SIM card residing a SIM card receptable of a user's mobile communication device. As previous discussed, the SIM card features, also referred to as parameters or attributes, may include communications features, electrical features, software/firmware features, hardware features and/or behavioral features. In response to extracting the baseline SIM card features, at Event 1204, a SIM card feature file is generated, and stored in memory, that includes the baseline SIM card features and is associated with the user's mobile communication device.

Subsequently, at Event 1206 a signal is received from the mobile communication device that indicates initiation of a resource exchange event and, in response to receiving the signal, at Event 1208, a plurality of SIM card features are extracted, in real-time, from the SIM card currently residing in the SIM card receptacle of the user's mobile communication device. The SIM card may be the same SIM card from which the baseline SIM card features were previously extracted or, in the event that the initial SIM card has been replaced with another SIM card, the SIM Card may be a different SIM card.

At Event 1210, the memory storing the SIM card feature file is accessed to perform a comparison between (i) the currently extracted SIM card features and (ii) the baseline features in the SIM card file or the NFT. In response to the comparison exhibiting a match between (i) the currently extracted SIM card features and (ii) the baseline features in the SIM card file or the NFT, at Event 1212, the resource exchange event is authorized for further processing. In optional embodiments of the method, in response to the comparison not exhibiting a match between (i) the currently extracted SIM card features and (ii) the baseline features in the SIM card file or the NFT, further processing of the resource exchange event is denied or further validation rules are identified and applied to determine whether further processing cane be authorized.

Referring to FIG. 16, a flow diagram is presented of a computer-implemented method 1300 for authenticating validation credentials, specifically SIM card feature-based validation credentials, in accordance with embodiments of the present invention. At Event 1302, a plurality of baseline SIM card features are extracted from an initial SIM card residing a SIM card receptable of a user's mobile communication device. As previous discussed, the SIM card features, also referred to as parameters or attributes, may include communications features, electrical features, software/firmware features, hardware features and/or behavioral features. In response to extracting the baseline SIM card features, at Event 1304 a first NFT is generated that is based on the extracted SIM card features. In this regard, the extracted SIM card features may comprise at least a portion of the input to the hash algorithm(s) used to generate the NFT.

In response to generating first NFT, at Event 1306, a smart contract is generated that is associated with the NFT and provides for access/use rules as between the contractual parties (i.e., the user and the entity using the NFT for authentication/validation purposes). At Event 1308 the first NFT and smart contract are communicated to a distributed trust computing network and, at Event 1310, first NFT is validated (i.e., the SIM card features are deemed to be authentic) via consensus of a plurality of the nodes of the distributed trust computing network. In response to NFT validation, at Event 1312, first NFT is stored on a distributed ledger of, or in communication with, the distributed trust computing network.

Thus, present embodiments of the invention provide systems, methods, computer program products and/or the like for a Subscriber Identity Module (SIM) card feature-based Non-Fungible Token (NFT). SIM card features, such as communication features, software/hardware features, electrical features, SIM Card behavior features and the like are extracted from the SIM card of a user's mobile communication device and a SIM card feature-based NFT is generated and stored on a distributed trust computing network. In this regard, the distributed trust computing network serves to verify the authenticity of the underlying SIM card features. The NFT is subsequently used as a means for authentication is resource exchange events and other events requiring user/mobile communication device verification.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for validating security credentials, the system comprising:
 a mobile communication device of a user and including a Subscriber Identity Module (SIM) card receptacle for receiving a SIM card;
 a first computing platform including a first memory and one or more first processing devices in communication with the first memory, wherein the first memory:
  stores a SIM card feature extraction engine that is executable by at least one of the one or more first processing devices and is configured to:
   extract a plurality of baseline SIM card features from an initial SIM card residing in the SIM card receptacle, and
  stores a SIM feature anomaly detection engine that implements one or more deep learning algorithms, is executable by at least one of the one or more first processing devices and is configured to:
   analyze changes between the baseline SIM card features currently extracted and the baseline SIM card features in a first Non Fungible Token (NFT) to determine which of the changes are indicative of normal SIM card behavior and which of the changes are indicative of abnormal SIM card behavior,
   for the changes determined to be indicative of normal SIM card behavior, generate a second NFT, and
   for the changes determined to be indicative of abnormal behavior, implement one or more suspicious activity actions, wherein the one or more suspicious activity actions comprises at least limiting use of the mobile communication device and communicating one or more alerts to designated entities;
 a second computing platform including a second memory and one or more second processing devices in communication with the second memory, wherein the second memory stores a SIM card feature-based NFT and smart contract generator engine that is executable by at least one of the one or more second processing devices and is configured to:
  generate the first NFT based on the baseline SIM card features
  generate a smart contract associated with the first NFT that comprises rules for accessing and using the first NFT,
  communicate the first NFT and smart contract to a distributed trust computing network; and
 the distributed trust computing network comprising a plurality of decentralized nodes, each decentralized node having a third memory and one or more third processing devices in communication with the third memory, wherein the third memory of the decentralized nodes is configured to store a distributed ledger, the distributed ledger comprising a plurality of data blocks, wherein the distributed trust computing network is configured to receive the first NFT and the smart contract, two or more of the plurality of the decentralized nodes are configured to validate an authenticity of the baseline SIM card features, and, in response to validation, store the first NFT as data block on the distributed ledger, wherein the SIM card feature extraction engine is further configured to:
 periodically, over time, extract the plurality of baseline SIM card features from the initial SIM card residing in the SIM card receptacle,
 determine changes between the baseline SIM card features currently extracted and the baseline SIM card features in the first NFT,
 wherein the SIM card feature-based NFT and smart contract generator engine is further configured to generate the second NFT based on the changes to the baseline SIM card features, and
 wherein the distributed trust computing network is configured to receive the second NFT and two or more of the plurality of the decentralized nodes are configured to validate an authenticity of at least the changes to the baseline SIM card features, in response to validation, store the second NFT as another data block on the distributed ledger, and according to at least one rule in the smart contract, the first NFT is deactivated and the second NFT is activated.

2. The system of claim 1, wherein the SIM card feature extraction engine is further configured to:
 detect (i) removal of the initial SIM card from the SIM card receptacle and (ii) insertion of another SIM card into the SIM card receptacle,
 in response to detecting (i) and (ii), extract a plurality of baseline SIM card features from the other SIM card residing in the SIM card receptacle.

3. The system of claim 2, wherein the SIM card feature-based NFT and smart contract generator engine is further configured to:
 generate the second NFT that is based on the baseline SIM card features of the other SIM card and associated with the mobile communication device, and
 wherein the distributed trust computing network is configured to receive the second NFT and two or more of the plurality of the decentralized nodes are configured to validate an authenticity of the baseline SIM card features of the other SIM card, and in response to validation, store the second NFT as another data block on the distributed ledger.

4. The system of claim 1, wherein the plurality of baseline SIM card features and the plurality of SIM card features include one or more of (i) communication features, (ii) software and firmware features, (iii) electrical features, (iv) hardware features, and (v) behavior of SIM card in respect to the mobile communication device.

5. The system of claim 1, further comprising:
a third computing platform including a fourth memory and one or more fourth processing devices in communication with the fourth memory, wherein the fourth memory stores a SIM card verification engine that is executable by at least one of the one or more fourth processing devices and is configured to:
receive a signal from the mobile communication device that indicates initiation of an event,
in response to receiving the signal, extract a plurality of SIM card features from a SIM card currently residing in the SIM card receptacle,
access the distributed trust computing network and perform a comparison between (i) the SIM card features, and (ii) the baseline SIM card features in the first NFT, and
in response to the comparison exhibiting a match between the (i) the SIM card features, and (ii) the baseline SIM card features in the first NFT, authorize further processing of the event.

6. The system of claim 5, wherein the fourth memory further stores an event validation rules engine, that is executable by at least one of the one or more second processing devices and is configured to:
in response to the comparison not exhibiting a match between the (i) the SIM card features, and (ii) the baseline SIM card features in the first NFT, determine one or more validation rules associated with authorizing the event to apply to the event based on attributes of one or more of (i) the user, (ii) the mobile communication device, and (iii) the event, and
apply the one or more validation rules to the event.

7. The system of claim 1, wherein the deactivation of the first NFT is disassociated with the SIM card.

8. A computer-implemented method for authenticating security credentials, the computer-implemented method is executable by one or more computing processor devices, the method comprising:
extracting a plurality of baseline SIM card features from an initial SIM card residing in a SIM card receptacle of a mobile communication device;
generating a first NFT based on the baseline SIM card features;
generating a smart contract associated with the first NFT that comprises rules for accessing and using the first NFT;
communicating the first NFT and smart contract to a distributed trust computing network;
validating an authenticity of the baseline SIM card features by consensus of two or more of a plurality of decentralized nodes that form the distributed trust computing network;
in response to validation, storing the first NFT as a data block on a distributed ledger of the distributed trust computing network;
implementing deep learning algorithms to analyze changes between the baseline SIM card features currently extracted and the baseline SIM card features in the first NFT to determine which of the changes are indicative of normal SIM card behavior and which of the changes are indicative of abnormal SIM card behavior;
for the changes determined to be indicative of normal SIM card behavior, generating a second NFT; and
for the changes determined to be indicative of abnormal behavior, implementing one or more suspicious activity actions, wherein the one or more suspicious activity actions comprises at least limiting use of the mobile communication device and communicating one or more alerts to designated entities;
periodically, over time, extracting the plurality of baseline SIM card features from the initial SIM card residing in the SIM card receptacle;
determining changes between the baseline SIM card features currently extracted and the baseline SIM card features in the first NFT;
generating a second NFT based on the changes to the baseline SIM card features;
communicating the second NFT to the distributed trust computing network;
validating an authenticity of at least the changes to baseline SIM card features in the second NFT by consensus of two or more of a plurality of decentralized nodes that form the distributed trust computing network;
in response to validation, storing the second NFT as a data block on a distributed ledger of the distributed trust computing network; and
activating the second NFT and deactivating the first NFT.

9. The computer-implemented method of claim 8, further comprising:
detecting (i) removal of the initial SIM card from the SIM card receptacle and (ii) insertion of another SIM card into the SIM card receptacle; and
in response to detecting (i) and (ii), extracting a plurality of baseline SIM card features from the other SIM card residing in the SIM card receptacle.

10. The computer-implemented method of claim 9, further comprising:
generating the second NFT that is based on the baseline SIM card features of the other SIM card and associated with the mobile communication device;
communicating the second NFT to the distributed trust computing network;
validating an authenticity of at least the baseline SIM card features in the second NFT by consensus of two or more of a plurality of decentralized nodes that form the distributed trust computing network; and
in response to validation, storing the second NFT as a data block on a distributed ledger of the distributed trust computing network.

11. The computer-implemented method of claim 8, wherein the plurality of baseline SIM card features and the plurality of SIM card features include one or more of (i) communication features, (ii) software and firmware features, (iii) electrical features, (iv) hardware features, and (v) behavior of SIM card in respect to the mobile communication device.

12. The computer-implemented method of claim 8, wherein the deactivation of the first NFT is disassociated with the SIM card.

13. A computer program product comprising a non-transitory computer-readable storage medium comprising code that, when executed, causes a computing entity to:
- extract a plurality of baseline SIM card features from an initial SIM card residing in a SIM card receptacle of a mobile communication device;
- generate a first NFT based on the baseline SIM card features;
- generate a smart contract associated with the first NFT that comprises rules for accessing and using the first NFT;
- communicate the first NFT and smart contract to a distributed trust computing network;
- validate an authenticity of the baseline SIM card features by consensus of two or more of a plurality of decentralized nodes that form the distributed trust computing network;
- in response to validation, store the first NFT as a data block on a distributed ledger of the distributed trust computing network;
- implement deep learning algorithms to analyze changes between the baseline SIM card features currently extracted and the baseline SIM card features in the first NFT to determine which of the changes are indicative of normal SIM card behavior and which of the changes are indicative of abnormal SIM card behavior;
- for the changes determined to be indicative of normal SIM card behavior, generate a second NFT;
- for the changes determined to be indicative of abnormal behavior, implement one or more suspicious activity actions, wherein the one or more suspicious activity actions comprises at least limiting use of the mobile communication device and communicating one or more alerts to designated entities;
- periodically, over time, extract the plurality of baseline SIM card features from the initial SIM card residing in the SIM card receptacle;
- determine changes between the baseline SIM card features currently extracted and the baseline SIM card features in the first NFT;
- generate a second NFT based on the changes to the baseline SIM card features, and communicating the second NFT to the distributed trust computing network;
- validate an authenticity of at least the changes to baseline SIM card features in the second NFT by consensus of two or more of a plurality of decentralized nodes that form the distributed trust computing network;
- in response to validation, store the second NFT as a data block on a distributed ledger of the distributed trust computing network; and
- activate the second NFT and deactivate the first NFT.

14. The computer program product of claim 13, further comprising code that, when executed, causes the computing entity to:
- detect (i) removal of the initial SIM card from the SIM card receptacle and (ii) insertion of another SIM card into the SIM card receptacle; and
- in response to detecting (i) and (ii), extract a plurality of baseline SIM card features from the other SIM card residing in the SIM card receptacle.

15. The computer program product of claim 14, further comprising code that, when executed, causes the computing entity to:
- generate the second NFT that is based on the baseline SIM card features of the other SIM card and associated with the mobile communication device, and communicate the second NFT to the distributed trust computing network
- validate an authenticity of at least the baseline SIM card features in the second NFT by consensus of two or more of a plurality of decentralized nodes that form the distributed trust computing network; and
- in response to validation, storing the second NFT as a data block on a distributed ledger of the distributed trust computing network.

16. The computer program product of claim 13, wherein the plurality of baseline SIM card features and the plurality of SIM card features include one or more of (i) communication features, (ii) software and firmware features, (iii) electrical features, (iv) hardware features, and (v) behavior of SIM card in respect to the mobile communication device.

17. The computer program product of claim 13, wherein the deactivation of the first NFT is disassociated with the SIM card.

* * * * *